(12) United States Patent
Gupta

(10) Patent No.: US 8,045,660 B1
(45) Date of Patent: Oct. 25, 2011

(54) WIDEBAND DIGITAL SPECTROMETER

(75) Inventor: Deepnarayan Gupta, Hawthorne, NY (US)

(73) Assignee: Hypres, Inc., Elmsford, NY (US)

( * ) Notice: Subject to any disclaimer, the term of this patent is extended or adjusted under 35 U.S.C. 154(b) by 877 days.

(21) Appl. No.: 11/957,389

(22) Filed: Dec. 14, 2007

Related U.S. Application Data

(60) Provisional application No. 60/939,835, filed on May 23, 2007.

(51) Int. Cl.
*H04B 1/10* (2006.01)
(52) U.S. Cl. ...................................... 375/350
(58) Field of Classification Search ............ 375/316, 375/340, 346, 350, 343; 708/300, 303, 322
See application file for complete search history.

(56) References Cited

U.S. PATENT DOCUMENTS

| | | | | |
|---|---|---|---|---|
| 5,949,832 | A * | 9/1999 | Liebetreu et al. | 375/344 |
| 6,392,397 | B1 * | 5/2002 | Thomas | 324/76.11 |
| 6,842,129 | B1 * | 1/2005 | Robinson | 341/143 |
| 7,280,623 | B2 | 10/2007 | Gupta | |
| 7,436,910 | B2 * | 10/2008 | Fudge et al. | 375/340 |
| 7,489,745 | B2 * | 2/2009 | Fudge | 375/340 |
| 2003/0054783 | A1 * | 3/2003 | Mason et al. | 455/150.1 |

OTHER PUBLICATIONS

Vernik, et al., "Integrated Millimeter-Submillimeter Superconducting Digital Spectrometer", IEEE Trans. Appl. Supercond., vol. 15, p. 419, Jun. 2005.
Rylyakov, et al., "All-digital 1-bit RSFQ autocorrelator for radioastronomy applications: design and experimental results", IEEE Trans. Appl. Supercon., vol. 8, p. 14, 1998.
Gupta, et al., "High-Speed Interchip Data Transmission Technology for Superconducting Multi-Chip Modules", IEEE Trans. Appl. Supercond., vol. 11, pp. 731-734, Mar. 2001.

* cited by examiner

*Primary Examiner* — Khanh C Tran
(74) *Attorney, Agent, or Firm* — Steven M. Hoffberg; Ostrolenk Faber LLP

(57) ABSTRACT

A method for reducing interference, comprising receiving a wideband signal, having at least one large amplitude component; adaptively modifying the wideband signal with respect to at least one high intensity component without substantial introduction of non-linear distortion, while reducing a residual dynamic range thereof; digitizing the modified wideband signal to capture information describing at least the high intensity signal at a sampling rate sufficient to extract modulated information present within the wideband signal at an upper limit of the band. The system analyzes a spectral characteristic of the wideband signal; and extracts adaptation parameters for the adaptive filtering. The system therefore provides both large net dynamic range and wideband operation. Preferably, the digitizer and filter, and part of the spectral characteristic analyzer is implemented in using superconducting circuit technology, with, for example low temperature superconducting digital signal processing components, and high temperature superconducting analog filtering components.

31 Claims, 13 Drawing Sheets

WIDEBAND DIGITAL SPECTROMETER

BACKGROUND OF THE INVENTION

One of the major difficulties in reception of small signals is the presence of a large unwanted signal in the same frequency band.

Typical spectrometers sweep a narrowband window across the band of interest, thereby converting the wideband into a series of narrow bands. Within each narrowband window, the signal is characterized, and when the sweep is complete, the signal is logically reconstructed. By analyzing a narrowband component, the signal can be frequency translated or downconverted to a nominal one, permitting a static detector to be used. Frequency translation typically requires the mixing of the signal with a tuning frequency in an analog non-linear element, such as a semiconductor. The nonlinear mixer generates sum and difference frequencies, one of which (typically the difference) is selected for analysis. All nonlinear components in the analog signal processing chain will generate spurious components, including intermodulation (sum and difference components of the existing signals) as well as harmonics. In a high quality spectrometer, this spectral pollution is undesirable, especially where there are many possible signal interactions, or where the signal source to be characterized may itself produce harmonics and other components to be characterized. Even in a narrowband spectral analyzer, nonlinear distortion may be a problem, since out of narrowband components may be translated into the band of interest. Another issue for swept narrowband spectrometers is that they cannot analyze a spectrum in realtime or near realtime, since there is a limited speed of sweep.

Another paradigm for constructing a wideband spectrometer is to translate the entire band of interest to baseband (i.e., a band from $f_1$ to $f_2$ is frequency translated to a band from 0 to $(f_2-f_1)$ using a nonlinear mixer with a frequency $f_1$) and digitized above the Nyquist rate (2 times the highest frequency component, i.e., $2(f_2-f_1)$). The digitized signal is then processed using a digital signal processor, for example using a fast Fourier transform, to reveal the spectral energy. This approach has a number of limitations. As in the narrowband approach, a nonlinear analog mixer is employed, and thus spectral pollution occurs. One known system, Pinckley, U.S. Pat. No. 5,519,890, expressly incorporated herein by reference, downconverts a cellular band signal, and then employs a tunable filter bank to remove carriers having interfering signals before digitizing the band, which is then digitally demodulated by a bank of digital signal processors.

The third possibility, directly digitizing the signal of interest, without frequency translation, has been infeasible at high frequencies, e.g., above 500 MHz, or at high dynamic range-frequency products, at least because of digitizer limitations. One particular limitation, discussed above, is the large amplitude interferer problem. Since the digitizer operates across the entire spectrum, it can be saturated or dominated by a single signal, thus masking other components. As the bandwidth to be analyzed (or dynamic range-frequency product) is increased, the likelihood of the presence of interferers increases. One approach to solving this problem is to increase the dynamic range of the digitizer to an extent necessary to handle both the interferor and the signal of interest. However, this may be difficult, and the problem grows exponentially with each added bit of dynamic range required.

In military communications, the large signal interferor problem may occur due to transmitters co-located on the reception platform and is often referred to as the co-site interference problem. One method of dealing with this problem is to have a large dynamic range receiver, capable of simultaneously receiving the large interferor and the small signal of interest (SOI). In fact, it is not the dynamic range, but the instantaneous spur-free dynamic range of the receiver that needs to be large, often imposing a linearity-requirement that is impossible to meet, even with ultra-linear superconductor front-ends. This requirement could be relaxed substantially if one or more of these interferors could be excised from the incoming waveform through sharp notch filters. However, these interferors often shift in frequency, especially in the case of narrow-band high-power jammers. Therefore, a tunable notch filter would be needed, along with appropriate logic and control for tuning it.

While interference from intentional enemy jammers remains a major problem for receivers, the problem of co-site interference is particularly severe for maritime communications and surveillance systems. On a ship, multiple high power communications and radar transmitters exist in close proximity to RF receivers on the same platform. Consequently, the receive antenna picks up a part of these transmit signals. Since military tactical communication systems are rapidly migrating towards wide bandwidths (hundreds of MHz to a few GHz), supporting multiple narrowband and broadband waveforms, the number of interferers in the wide receive band continue to rise. Co-site interference manifests itself in three forms:

1) Small signal of interest in the presence of large interfering signal (FIG. 2A),
2) Small signal of interest in the presence of a large number of signals of comparable power (FIG. 2B),
3) Impulsive interference from hoppers.

The worst problem occurs through a large in-band interferer that drives the receiver into saturation. This creates non-linear distortions or spurs, preventing detection of the much smaller signal-of-interest. Spurs also occur from in-band intermodulation products from large out-of-band interferers. The presence of these spurious signals and other small interferors prevents full usage of the receiver spectrum. Finally, the transients from hopping transmitters also cause interference. All these effects severely limit functionality of RF receivers, and indirectly the co-located transmitters. The following difficulties arise from the inability of current communication systems to reject, cancel, or tolerate co-site interference:

| Difficulties | Consequence |
|---|---|
| Poor spectrum efficiency and wastage of available spectral resource | Information capacity is compromised |
| The number of hoppers than can be supported on a platform is limited | Fewer channels of secure communications are available |
| Small signals of interest cannot be detected; low probability of intercept signaling affected | Shorter communication range; Increased vulnerability to interception of communication by enemy |
| Dynamic frequency and bandwidth allocation schemes are not permitted | Longer operational planning time and reduced agility in battle situations |

The situation is even worse for surveillance (e.g. SIGINT) receivers. These very wideband receivers, attempting to listen for weak signals, can be rendered useless by large co-site interferers. Often one has to resort to the extremely undesirable solution of shutting down the SIGINT receiver for short periods of time to combat the self-jamming from co-located high-power transmitters, compromising the survivability of the whole ship.

The reception of weak signals of interest over a wide RF band requires a sensitive and high-linearity receiver. Presence of large unwanted signals makes this task difficult, by reducing the usable spectrum and dynamic range of the receiver. The traditional method of dealing with the interference problem is to use band-stop or notch filters to excise the interferers from the band-of-interest. This approach, employing analog RF components, does not work well when the interferers are numerous, very narrow compared to the passband, and change their spectral locations rapidly. Another approach, called digital-RF, is to digitize the whole band with an analog-to-digital converter (ADC) and perform signal extraction and interference rejection in the digital domain. However, the simple digital-RF approach requires an extremely high dynamic range that is well beyond the current state-of-the-art for high frequencies.

Fixed-tuned filters made from the high temperature superconductors (notably YBCO) have been demonstrated with <0.5 dB insertion loss, 110 dB of rejection with transition slope of 30 dB/100 kHz, and as little as 1% band width. However efforts to develop tuning capability are so far limited to mechanical means and require seconds or more. This is too slow for wide utility. The DARPA FAME program failed to provide a fast, low loss, wide band tuning mechanism. MEMS tuned filters have issues with tuning speed (microsecond tuning at best), and wear out due to mechanical stress after a few billion cycles.

A typical digital-RF receiver front end does not include any tunable analog notch filters for interference rejection. Instead of performing interference rejection, the digital-RF receiver front-end is interference tolerant; it uses an ADC that has sufficient linearity and dynamic range to tolerate the presence of all interferers along with signals-of-interest. Thus, the problem is transferred to the digital domain, where digital filters extract the signals-of-interest. Digital filtering in the frequency domain with an equivalent high order essentially performs the same function as the analog filter that it replaces, albeit with much better flexibility and agility in tuning. Moreover, in the digital domain, one can employ techniques for matched filtering not just in the frequency domain but also in time and/or phase domains for more efficient signal extraction.

In spite of its obvious attraction, the practicality of this digital-RF approach depends on the availability of ADCs with high dynamic range over a wide bandwidth. To get an estimate of the required dynamic range let us consider a single co-site transmitter interfering with a receiver. If the transmitter power is 100 W (50 dBm) and the isolation to the receive antenna is 30 dB, the required dynamic range for receiving a −120 dBm signal-of-interest is 140 dB (~23 bits). Under certain circumstances, the dynamic range requirement can be as high as 160 dB. Conventional ADCs, based on mature semiconductor technology, cannot achieve this performance over hundreds of MHz of bandwidth (e.g. the 225-400 MHz UHF band, or the 960-1215 MHz L-band).

On the other hand, simple first-order superconductor ADCs have demonstrated spur-free dynamic ranges in the 100 dB range, matching and slightly exceeding the performance of the best semiconductor ADCs. These ADCs employ delta or delta-sigma modulators with extremely high oversampling ratios (the sampling is at 20-40 Gbps, much higher than the bandwidth of ~200 MHz). Higher sampling rates imply higher oversampling ratio (R) and therefore, larger dynamic range. Since the dynamic range scales as $R^{(2n+1)}$, where n is the order of the modulator, increasing the order of the ADC modulator is expected to improve the dynamic range substantially. Another approach for increasing dynamic range is concatenating the dynamic ranges of multiple ADCs in a subranging architecture.

While the future holds promises of such advances, the large signal interferor persists, and indeed, will persist until the dynamic range of the digitizer exceeds the maximum required dynamic range. Even when such a digitizer becomes available, likely cost and complexity issues will remain.

SUMMARY AND OBJECTS OF THE INVENTION

The RF spectrum is becoming increasingly crowded. Efficient spectrum usage requires real-time spectral monitoring, combined with dynamic re-allocation of communications channels to available bands. Furthermore, signals intelligence (SIGINT) requires real-time awareness of enemy communications, and broadband spectrum monitoring can help to identify bands that should be subject to more detailed scrutiny. A broadband spectrometer with the ability to rapidly zoom to narrower bands of interest would be especially valuable. The present invention provides a digital spectrometer based on autocorrelation, which includes both wideband stare and narrowband zoom capabilities. This is preferably integrated with a digital cross-correlation receiver, using the common circuit elements, to identify and detect weak signals-of-interest. A preferred embodiment of the present invention provides an elegant digital-RF architecture that utilizes direct conversion of RF signals to the digital domain to permit, for example, simultaneous processing of multiple identical digital copies for spectrum calculation and signal matching.

A new architecture is proposed, see FIG. 1, where a coarse resolution, high-linearity ADC, is used to determine the location (i.e., a frequency) of a large signal or signals, which is then fed back to a tuning control circuit to control a linear transform processor, such as to set the notch frequencies or other characteristics of a tunable filter or filter bank, or signal processor. Another high-linearity, high-sensitivity ADC, with a higher dynamic range is used to receive small signal(s) of interest. This ADC might be over-loaded until the large signals are excised, by correct positioning of the tunable notch(es) through the coarse (low-sensitivity) ADC control loop.

In fact, the two ADCs may operate in conjunction, and therefore the signal analysis functions need not be physically separated according to hardware partitioning. Typically, the coarse and fine resolution ADCs will operate at the same sampling rate, and therefore may be synchronized.

The preferred approach according to the present invention is a mixed signal scheme that combines digitally-controlled tunable analog filters for removal or attenuation of the strongest interferers with a high-dynamic range digital-RF receiver, using a digital-RF broadband spectrometer for dynamic spectral monitoring of interferers.

In general, a preferred signal processing system comprises a subranging system, in which the coarse signal characterization unit performs an initial estimate on the signal of interest, and modifies the operating range for a fine signal characterization unit, to permit more optimal operation within the modified operating range. In contrast to known subranging analog-to-digital converters, the coarse unit simply defines a subset of an amplitude range, while in accordance with a preferred embodiment of the present invention, the coarse detection is not so limited, and may represent a time, frequency, or wavelet domain characteristic of the gross signal, or other characteristic. The processing which is dependent on the coarse signal may be a filtering, tuning of the fine system sampling or signal processing. Typically, the coarse unit modifies an environment of operation of the fine unit, without itself altering the operation of the fine unit. The coarse unit detects signal components which are out of range for the fine unit, and adjusts a signal processing to process so that it remains within the operating range.

As discussed above, a preferred embodiment uses the coarse unit to estimate characteristics of a narrow band interfering signal, and adjust a notch filter to selectively remove the interfering signal. Since the coarse and fine units are the analog-to-digital signal processing units, the filtering is typically performed in the analog domain, and the filters are typically time continuous. However, it is also possible to perform a discrete time filtering (analog), or a digital-hybrid signal processing chain. Thus, for example, the interfering signal may be removed with a tuned analog filter, or a hybrid digital subtraction filter (a filter which sums the input analog signal and a digitized signal generated to represent the desired offset of the analog signal necessary for further processing).

Preferably, the system is implemented with superconducting logic, which permits direct baseband or broadband processing of microwave signals, without down-conversion or frequency translation, but the technique according to the present invention is not so limited.

Since the coarse (large signal) ADC does not have to measure the interferor accurately, but only determine its spectral location, the coarse ADC can be low-resolution. An autocorrelator may be used to obtain the discrete Fourier transform of the signal, especially when a fast serial technology (e.g. RSFQ) is used to implement this design. See, e.g., US 20040022332, U.S. patent application Ser. No. 10/210,882, expressly incorporated herein by reference in its entirety.

For additional precision, one may include additional cancellation loops of increasing precision.

Also, the high-resolution ADC may consist of one or more individual ADCs, in a subranging or cascaded architecture.

Superconductor technology, such as Josephson junction and SQUID-based ADC front-ends, may be used to produce the coarse, large-signal ADC and the fine, high-resolution ADC, to take advantage of high front-end linearity and speed. With such a front-end, naturally the digital filter and Fourier transform processor may also be implemented with RSFQ technology.

The tunable notch filters may be produced using high-temperature superconductor filters that exhibit very sharp and deep notches.

In a corresponding manner, the technique may also be used perform other frequency domain, time domain, or hybrid domain (e.g., wavelet domain) processing on a received signal. Advantageously, the technique may also be applied to antenna arrays and spatial domain processing, for example phased arrays and synthetic aperture antennas. For example, similarly to the analog tuning of notch filters, an electronically controlled antenna array may be controlled to reject interfering signals from a particular location or direction, even if it has the same frequencies as a signal of interest. Therefore, so long as the antenna array elements and analog components remain linear in operation (and not saturated, for example), controllable time delay elements may be employed to sum or difference signal components, which, if the array elements are delayed and weighted appropriately, will result in a linear rejection of an interfering signal, while retaining other signals.

The present invention therefore provides full speed (e.g., direct digitization of the radio frequency signal substantially without frequency translation) first stage detector(s) which is/are operable to detect characteristics of a large amplitude signal, and second stage detector(s) which is/are operable to detect a low level, high dynamic range signal from a signal representation processed to remove interference from the large amplitude signal(s). The first stage detector is preferably analyzed at the output data rate, which for example is at the digitizer sampling rate. Thus, for example, the coarse digitizer operates at a data output rate of at least 500 megasamples per second, and for example, may operate at 20-40 Gigasamples per second. The output of the digitizer may be converted to a lower data rate, higher resolution digital signal. The output of the digitizer, either as a single bit stream representation of the input, or a higher bit representation, is preferably analyzed with an autocorrelator. An autocorrelator typically accepts a series of inputs, which are shifted in a delay line with each digital sample. The shifted representations are then multiplied with a signal representation with a different delay, and summed in an integrator. The output of the autocorrelator provides a representation of a spectral characteristic of the incoming signal. This spectral representation may be further processed to yield a completed Fourier transformation with digital values representing frequency components of the signal.

The first stage detector operates at high speed, to permit a direct digital detection of a baseband (i.e., a signal whose frequency components are expected to include frequencies approaching zero) or broadband signal (i.e., a signal with a large fractional bandwidth, but typically does not extend to zero frequency), with interferors present. The second stage detector preferably also operates at high speed (e.g., the same or similar analog sampling rate as the coarse digitizer), but may have a different range of operation, tailored to the signal(s) of interest. It is noted that the signal of interest and the interferor are relative terms, and in various cases, a single signal may be considered both of interest and interfering. Thus, in a generic sense, the first stage detector determines a "landscape" of signals (e.g., spectrum or spectral characteristics), while the second stage operates on a processed representation which has reduced interfering peaks of the "landscape", thus permitting high resolution, but over a more limited dynamic range than the raw signal.

It is further understood that the present invention is not limited to a one dimensional (e.g., amplitude over time) or two dimensional (e.g., azimuth and elevation over time) signal, but may also encompass processing of signals of higher dimensionality as well, such as spatial arrays or more complex arrangements.

According to one embodiment of the invention, a mixed-signal RF receiver solution combines an RF spectrum monitor for detection and real-time monitoring of interferers, digitally-controlled analog filters (e.g., digitally controlled tunable notch filters) for excision of one or more large interferers in the analog domain, and a high-dynamic range digital-RF receiver for efficient processing of the residual, including the signals of interest and possible lower amplitude interferers. This solution utilizes the complementary strengths of both analog and digital RF technology to avoid the weaknesses of either approach. The required ADC dynamic range for the digitization can be greatly reduced if large interferers are rejected or cancelled before digitization, that is, the system provides an adaptive analog filter ahead of the digitizer. One difference between the simple digital RF (i.e., direct digitization of unprocessed baseband or broadband signals) and the mixed-signal RF approach according to a preferred embodiment of the present invention is the use of tunable analog processors (e.g., filters), whereas a fixed, wideband analog bandpass filter (e.g., antialiasing filter) may be present in a "simple digital RF" front-end.

Another aspect of the invention provides analog filters which are electronically controlled at very high speed, for example with a nanosecond scale tuning latency, based on superconducting electronics. Thus, for example, an analog filter component (of which there may be hundreds or thousands in a filter bank for notch filtering a number of large amplitude interferors) based on a high temperature (e.g., 30-100K) superconductor receives a control signal from a Josephson junction, which is, in turn, is controlled by a digital signal processor, for example fabricated using conventional technologies, e.g., ambient temperature silicon. As used herein, ambient temperature means that the circuit may operate at room temperature, subject to possible cooling, and self-heating.

It is also possible to implement the filter control circuit using low temperature superconducting technologies, and indeed, to assure arbitrary change nanosecond filter tuning response times, this may be preferred. However, this is not necessary in many cases, and traditional digital signal processing technologies, such as FPGAs, generic DSP devices, and the like, may be employed.

The present invention comprises a plurality of objects, not all of which need be achieved in any implementation. Likewise, the invention may encompass other constructs and methods not specifically identified as objects. The scope of the invention is limited only by the claims, and the objects are not to be construed as limiting.

One object provides a signal processing system, comprising an input, for receiving a time-continuous signal having at least two signal components; a first signal sampler, receiving the signal, and producing a discrete-time signal in dependence thereon; a signal processor, receiving the discrete time signal, and transforming the signal to generate therefrom a set of spectral signal characteristics; an analog signal processor, receiving at least one control signal dependent on the set of spectral signal characteristics, and the time-continuous signal, and producing at least one modified analog output based thereon; and a signal quantizer, receiving the modified signal, and quantizing it to produce a quantized output, the quantized output being substantially without intermodulation distortion products of the at least two signal components. The first signal sampler may comprise a superconducting analog to digital modulator. The signal processor may comprise a digital cross correlator. Likewise, the signal processor may comprise a digital cross correlator and a processor for computing a signal transform based on the cross correlation of the discrete time signal. The signal transform may comprise a frequency domain transform, and wherein the analog signal processor receives the control signal in dependence on at least one frequency transform domain characteristic of the time-continuous signal. Other transforms may also be employed, for example wavelet or other known transforms. The analog signal processor may comprise a frequency selective filter, and wherein characteristics of the frequency selective filter are determined based on frequency components of the time-continuous signal. At least one of the first signal sampler, at least a portion of the signal processor, and at least a portion of the analog signal processor may comprise superconducting circuits.

Another object provides a spectrometer, comprising an input receiving a wideband radio frequency signal; an analog filter having a controllable transfer function without substantial nonlinearity; a wideband signal digitizer, having a sampling rate of at least twice a highest frequency of interest of the wideband radio frequency, receiving a representation of the wideband radio frequency signal substantially without nonlinear distortion; a digital processor, receiving an output of the wideband digitizer, and processing the output to compute spectral characteristics thereof; and a filter control, controlling the transfer function of the controllable analog filter in dependence on at least the computed spectral characteristics. The wideband radio frequency signal may comprise a frequency of at least 500 MHz. The digital processor may receive data from the wideband signal digitizer at a rate of at least 1 GHz. The digital processor may comprise a digital cross correlator.

A further object provides a spectrometer, comprising an input receiving a wideband radio frequency signal having at least one radio frequency component; a controllable analog filter having a controllable transfer function adapted for attenuating the at least one radio frequency component; a wideband signal digitizer, receiving a representation of the wideband radio frequency signal substantially without broadening of a spectrum of the at least one radio frequency component, and having a sampling rate of at least twice a maximum frequency of the at least one radio frequency component; and a digital processor, receiving an output of the wideband digitizer, and processing the output to compute a transfer function of the controllable analog filter to attenuate the at least one radio frequency component. A signal received by the wideband digitizer is preferably representative of a linearly filtered wideband radio frequency signal, without substantial nonlinear distortion. The digital processor may compute spectral characteristics of the output of the wideband digitizer. The wideband radio frequency signal may comprise a component having a frequency of at least 500 MHz. The digital processor may receive data from the wideband digitizer at a rate of at least 1 GHz. The digital processor may comprise a digital cross correlator. One or more of the controllable analog filter, the wideband signal digitizer, and the digital processor may comprise at least one superconducting circuit component. For example, the controllable analog filter may comprise a high temperature superconductor circuit.

Another object is to provides a spectrometer, comprising an input receiving a wideband radio frequency signal having a first signal component of a first amplitude and a second signal component having a second amplitude, said second signal communicating information; a wideband signal digitizer, having a maximum dynamic range less than a ratio of the amplitude of the first signal component and a minimum amplitude of an information-bearing component the second signal component required for extraction of information therefrom; an estimator for estimating a characteristic of the first signal component; and a filter, responsive to the estimated characteristic, for altering the ratio of the first signal component and the information-bearing component, without introducing substantial nonlinear distortion, to a ratio within the maximum dynamic range. The characteristic may comprise a spectral characteristic of the wideband radio frequency signal. A signal received by the wideband digitizer is preferably representative of a linearly filtered wideband radio frequency signal, without substantial nonlinear distortion thereof. The estimator may receive data from the wideband signal digitizer at a rate of at least 1 GHz. At least one of the first signal component and the second signal component may comprise a frequency of at least 500 MHz. The filter, the wideband signal digitizer, or the estimator may comprise at least one superconducting circuit component. Preferably, the filter comprises a low or high temperature superconductor circuit, or a hybrid design.

An object also provides a radio receiver, comprising an array of inputs receiving components of a wideband radio frequency signal having a first signal component of a first amplitude and a second signal component having a second amplitude, said second signal communicating information; a controllable linear processing matrix, receiving the array of inputs and combining at least two representations derived from the array of inputs to alter a ratio of the first signal component to the second signal component; and a processor, receiving at least one signal component derived from the array of inputs, digitizing the signal component above a Nyquist rate thereof, substantially without frequency translation thereof, and controlling the controllable linear processing matrix in dependence thereon. The processor may selectively control one or more of a delay, a respective weighting, and a filtering of a signal component. The processor may comprise at least one superconductor circuit. The processor may analyze at least one spectral characteristic from the array of inputs.

Another object provides a method for reducing interference in a saturable circuit, comprising receiving a wideband electromagnetic radiation signal, having at least one large amplitude component; adaptively filtering the at least one large amplitude component to reduce a dynamic range of a wideband residual of the wideband electromagnetic radiation signal; digitizing the wideband residual, at a sampling rate in excess of a twice a frequency of the at least one large amplitude component; analyzing a spectral characteristic of the digitized residual; and extracting adaptation parameters from the digitized residual for said adaptively filtering. The method may further comprise the step of cooling at least one element to achieve superconductivity. The analyzing step may comprise digitally computing a correlation. The analyzing step may comprise computing a signal transform in dependence on the correlation. The signal transform may comprise a time-domain to frequency domain transform, the adaptation parameters being dependent on the frequency domain transform, and wherein the wideband residual is substantially without intermodulation distortion with respect to the wideband electromagnetic radiation signal.

A further object provides a real time spectrometric method, comprising receiving a transmitted wideband electromagnetic radiation signal, having at least one large amplitude component; adaptively filtering the at least one large amplitude component to reduce a dynamic range of a wideband residual of the wideband electromagnetic radiation signal; quantizing an amplitude of the wideband residual, at a sampling rate in excess of a twice a frequency of the at least one large amplitude component of the transmitted wideband electromagnetic radiation signal; analyzing the quantized amplitudes of the wideband residual comprising multiplying at the sampling rate a time series representing the at least one quantized amplitude, to determine at least one spectral characteristic of the digitized residual; and extracting adaptation parameters from the digitized residual for said adaptively filtering. At least one large amplitude component may have a frequency of at least 500 MHz. The quantizing may occur at a rate of at least 1 GHz. The analyzing may comprise computing a correlation. The wideband residual is preferably substantially free of non-linear distortion with respect to the transmitted wideband electromagnetic radiation signal. The method may further comprise the step of cooling a component to achieve superconductivity. The quantizing step may comprise employing a superconducting quantum interference device in a delta-sigma digitizer topology.

A still further object provides a method for receiving at least one signal of interest, comprising receiving a transmitted wideband electromagnetic radiation signal, having at least one signal component above 500 MHz; adaptively filtering the wideband electromagnetic radiation signal; quantizing an amplitude of the filtered wideband electromagnetic radiation signal, at a sampling rate of at least 1 GHz; extracting adaptation parameters from the quantized amplitudes for said adaptively filtering; multiplying, at an effective throughput of at least the sampling rate, a time series representing the quantized amplitude, to extract information from the wideband electromagnetic radiation signal. One or more of the adaptively filtering and quantizing may employ a superconducting device. The adaptively filtering step may employ at least one high temperature superconductor device, and said quantizing step employs at least one low temperature superconducting device, and the method may further comprise the step of cooling the high temperature superconductor device and the low temperature superconductor device with outputs of different stages of a multi-stage cryocooler.

The present technology also provides a signal processor, comprising an input, adapted to receive a time-continuous signal having an input dynamic range represented by ratio of a maximum amplitude of a first signal component, and a minimum amplitude difference between two modulation states represented within a second signal required for demodulation thereof, wherein the first signal component and the second signal component have substantially different spectral characteristics; a spectrometer, receiving the input, and determining a spectral characteristic of at least the first signal; a spectral processor, responsive to the spectrometer, to selectively attenuate a maximum amplitude of the first signal to produce a filtered signal; a signal quantizer, receiving an output of the spectral processor, having a quantizer dynamic range less than the input dynamic range, the quantizer dynamic range being sufficient to detect the two modulation states represented within the second signal, wherein a signal path from the input to the signal quantizer is substantially linear and does not substantially introduce intermodulation distortion which interferes with detection of the two modulation states of the second signal. The first signal component may have, for example, substantial power at a frequency in excess of 500 MHz. The dynamic range is, for example, greater than about 96 dB, or 102 dB, or 108 dB, or 114 dB, or 120 dB, or 126 dB or 132 dB. The system preferably responds to a first signal component which has a spectral characteristic which changes at a rate faster than about once per microsecond. For example, the spectrometer determines the spectral characteristic at a rate faster than about once per microsecond. The spectral processor may respond to the spectrometer at a rate greater than about once per microsecond. The input may comprise a radio frequency signal received substantially without frequency translation, for example from an antenna through a low noise amplifier. The spectrometer may comprise a digital signal correlator, e.g., an autocorrelator or a cross correlator. The signal processor may have a bandwidth of at least 50 MHz, at least 100 MHz, at least 200 MHz, at least 250 MHz, at least 500 MHz, at least 1 GHz, at least 5 GHz, at least 10 GHz, or at least 20 GHz. The signal processor preferably has an intermodulation distortion of less than 60 dB, more preferably of less than 72 dB, and may have an intermodulation distortion of less than 84 dB, or less than 96 dB, or less than 102 dB. The signal quantizer may comprise a superconducting device, preferably a low temperature superconducting device. The spectrometer may comprise at least one superconducting logical unit, e.g., a superconducting digital correlator.

The spectral processor may comprise a notch filter, and preferably a plurality of notch filters (e.g., 2, 3, 4, 5, 10, 16, or more filters) each having an independently controllable notch frequency. The spectral processor may comprise a plurality of independently controllable analog filters. The spectral processor comprises at least one digitally controllable notch filter having notch width less than about 10% of a signal bandwidth, and may have a notch width of <5%, <2%, <1%, or less. The spectral processor may comprise at least one digitally controllable notch filter having a notch center frequency tunable across an entire signal bandwidth, and/or a bank of digitally controllable notch filters, which together are capable of providing a notch center frequency tunable across an entire signal bandwidth. The spectral processor may comprise at least one digitally controllable notch filter having a selectively controllable notch width and notch center frequency. The spectral processor may comprise a set of digitally controllable notch filters adapted to together track a plurality of sidebands of the first signal component. The spectral processor may comprise a digitally tunable low or high temperature superconducting filter. The spectral processor may comprise a Josephson Junction, e.g., a Josephson Junction for tuning a superconducting filter.

The spectrometer may comprise a first section which computes a correlation of a digitized representation of the time-continuous signal with itself or a reference signal, and a second section for deriving spectral characteristics from the correlation, wherein the first section has a data input rate corresponding to the signal quantizer data rate (or an integral division thereof) and the second section has a data input rate less than the digital quantizer clock rate. The second section data input rate may be, for example, less than one-quarter of the first section data input rate. For example, with a 16 tap correlator, the second section data rate may be one-sixteenth of the first section data rate. For example, this reduction in data rate can permit use of a technology which has slower clock rates in the second section. The spectrometer may comprise a first section which computes a correlation of a digitized representation of the time-continuous signal with itself or a reference signal, and a second section for deriving spectral characteristics from the correlation, wherein the first section has a synchronized data input rate corresponding to one-half or one-quarter of the signal quantizer clock rate. For example, the signal quantizer produces or is processed to produce a two or four bit output. Likewise, other binary submultiples may also be employed.

The signal quantizer may comprise a delta-sigma digitizer, e.g., a superconducting quantum interference device in a delta-sigma digitizer topology.

BRIEF DESCRIPTION OF THE DRAWINGS

The invention will now be described with reference to the drawings, in which.

DETAILED DESCRIPTION OF THE PREFERRED EMBODIMENTS

It is possible to quickly electrically tune (nanosecond response times) high-quality superconductor analog filters using Josephson junctions (JJs), to deliver steeply walled, >60 dB deep band reject filters, tunable by >30% of the center frequency of 8 GHz or elsewhere in the 4-10 GHz range. Room temperature normal metal filters lack the required quality factor (Q) for such sharpness. Superconductor filters have demonstrated desirable filter characteristics but tuning mechanisms to date are either too slow (mechanical) or introduce too much non-linearity (varactors). Even tuning with MEMS devices, the fastest tunable filters so far, is limited to several microseconds.

Figure 3A:
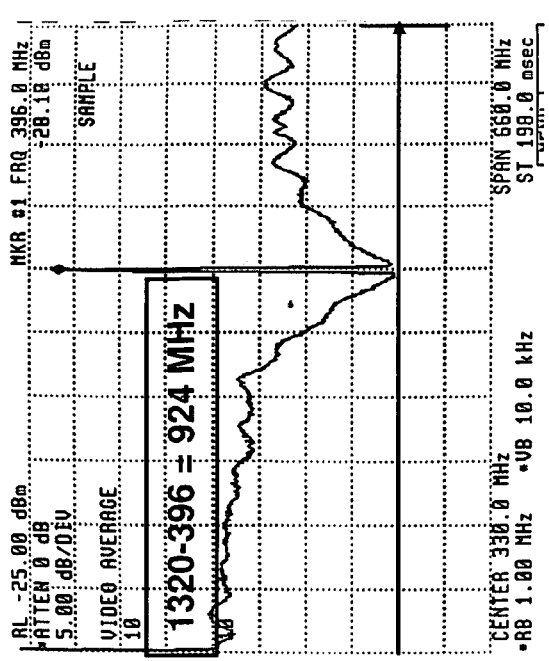
FIGS. 3A and 3B shows tuning performance of a Josephson junction tunable filter.
Figure 3B:
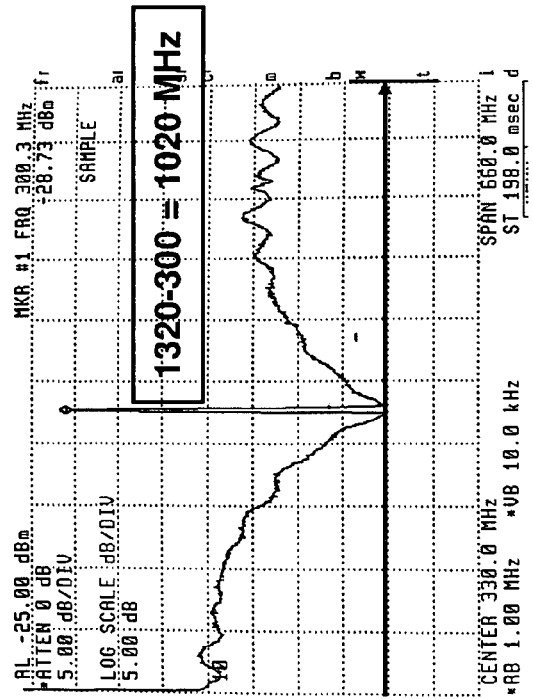

One embodiment according to the present invention provides the use of JJs as variable inductors, by controlling a DC bias current below its critical current (see FIGS. 3A, 3B and 3C). The JJs respond in picosecond time scales, and do not, by themselves, limit the speed of the analog filter implementation. Therefore, the response time limitation is shifted to either the inherent ring up time of the filter or to the control electronics, where tuning times in the nanosecond range are achievable.

In order to achieve nanosecond response times, the output of an autocorrelator receiving a representation of an input analog signal (e.g., a single-bit digitized signal) is transferred from a low temperature superconductor within a cryocooler to a room temperature digital signal processor, where the autocorrelator output is converted into a frequency spectrum, in a circuit with relatively high complexity but requiring only a few clock cycles. This frequency domain representation is then further processed to define JJ control parameters, using a second stage circuit, which may also require only a few clock cycles. Of course, it is also possible to convert the autocorrelator output to a set of filter control parameters without an intervening frequency domain representation, and indeed, it is also possible to perform this processing at low superconducting temperatures. Further, it may also be possible to generate filter control parameters using a device which does not implement a true autocorrelator function.

A preferred embodiment according to the present invention employs bandpass delta-sigma (BP ΔΣ) analog-to-digital converters (ADCs) for direct digitization of 1-20 GHz RF signals. For example, such a converter can digitize U.S. Army 7.5 GHz SATCOM signals.

Figure 3C:
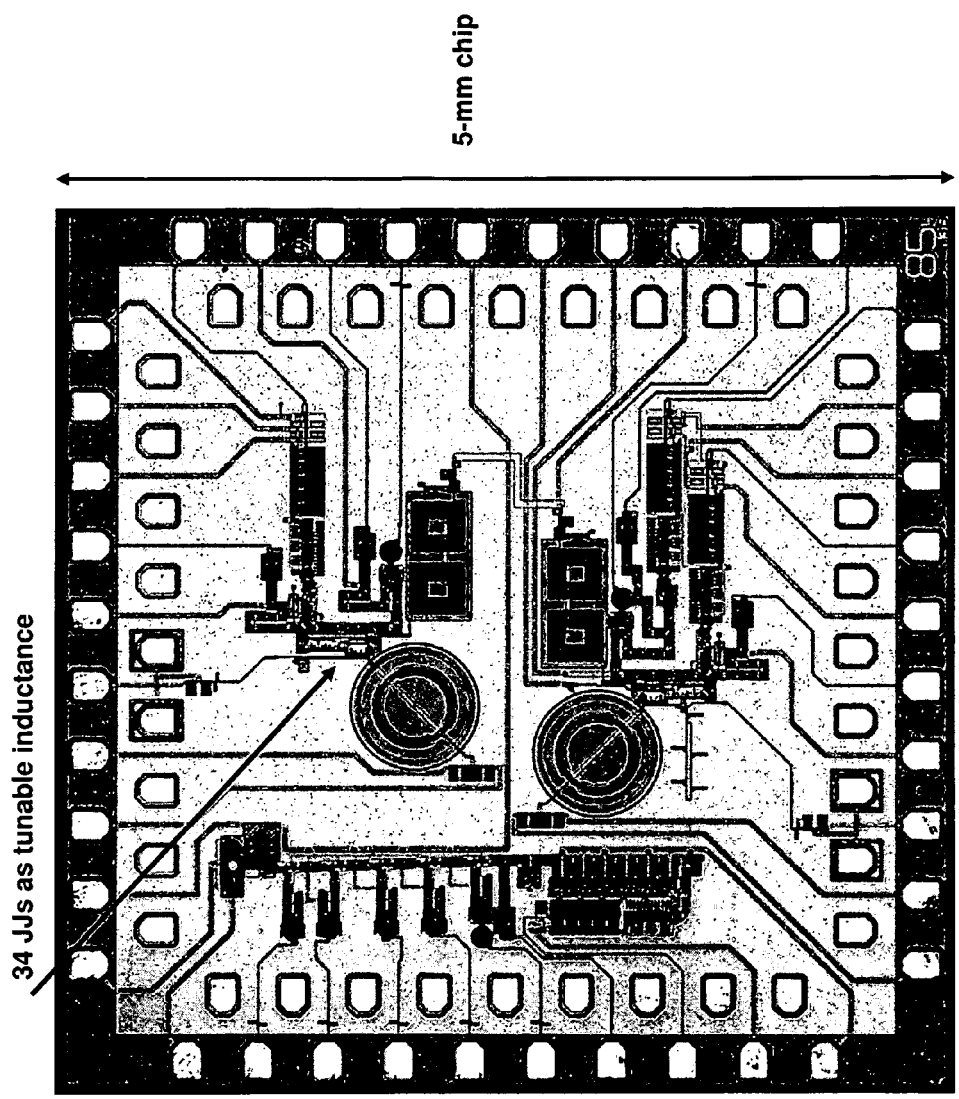
FIG. 3C shows a micrograph of a Josephson junction tunable filter.

According to a preferred embodiment of the invention, the resonance of the lumped LC resonator inside the $\Delta\Sigma$, loop may be tuned, with an array of JJs as a variable inductor (FIG. 3C). A $Q \geqq 1000$ is available at 25 GHz in a niobium superconducting process fabricating JJs (niobium, aluminum oxide, niobium layers). In a multiple JJ element embodiment, each JJ may be separately biased, to account for potential junction non-uniformities.

Alternately, a tunable YBCO (yttrium barium copper oxygen) filter (high temperature superconductor) may be employed.

The use of embodiments of the present invention greatly enhances wide band signal intercept systems by successfully coping with the increasing number of simultaneous signals that must be prosecuted. The minimum frequency separation of signals is decreased over traditional architectures. Embodiments of the present invention also enhance reactive interference cancellation systems, to provide jammer immunity. The probability of capture of hard to detect signals due to spreading under several other signals will also be improved. The system preferably employs cooled RF filters and low noise amplifiers, which lower the system noise temperature by >2 dB. The system may operate in an unshielded space environment, since the Nb JJ tuning elements are extremely radiation hard. The passive parts of the filter are even more radiation hard.

A preferred implementation of the linear transform processor employs a superconducting JJ as a tunable inductive element in a filter element. A single JJ resonator has a 10% tuning of the resonant frequency, and therefore >30% tuning of a 1% BW filter that is steeply enough walled to produce >60 dB attenuation at the center is possible with more complex designs. This attenuation is at least 15 dB deeper and the tuning range is comparable to that achieved by typical other means. The anticipated insertion loss is <<1 dB compared to ~3 dB for a 40 dB center rejection conventional filter with the same bandwidth.

Likewise, other types of linear transforms are possible using such tunable elements, and thus the linear transform processor need not be implemented as a notch filter or notch filter bank.

Further, discrete-time (sampled) analog transform processors may also be implemented. For example, an analog discrete time Fourier transform processor may be implemented using superconducting processes as switches and linear elements. In that case, even if an interferor causes saturation, and therefore, nonlinearity of the transform, this non-linearity has limited effect on the remaining signal components, and thus remaining "bins" are unperturbed. A further linear transform may also be performed on the data, which for example is expressed in a frequency domain or hybrid frequency domain. Thus, an inverse transform may then be implemented, yielding a representation of the original signal but, for example, with a transfer function similar to a narrow-band notched filtered representation with the interferor limited in amplitude to the available dynamic range, or further attenuated based on the additional transform. This implementation has the advantage that it is not necessary to actually measure the characteristics of the interferor, since the saturation and limiting is inherent and automatic. The second transform may be static or adaptive, and thus may optionally receive a control input.

The discrete time transform processor may employ similar technologies to the analog to digital converter; however, since this processor does not employ a quantizer or feedback of synthesized signals, it is not limited by many of the factors which otherwise limit the spur free linear dynamic range of the digitizer (quantizer). For example, this may be implemented using superconducting summers, energy storage elements, switches, or the like.

The tuning of the elements forming the superconducting filter is accomplished by varying the input bias current to a Josephson junction in order to change its inductance. This is analogous to the variation of the bias current to control speed of fluxon propagation down an active Josephson transmission line (JTL), a common technique in rapid single flux quantum (RSFQ) circuits, and it is well understood that junction inductance depends on bias current. The tuning method involves no mechanical motion or alteration of stress within the devices, and thus no wearout mechanism. This tuning occurs on picosecond time scales as the bias current is altered, and therefore, the bias control circuitry will determine the response time.

This process may be implemented using a standard, commercial Nb thin film fabrication process, such as available from HYPRES (Elmsford, N.Y.), which has demonstrated Nb filters in sizes down to $\frac{1}{100}^{th}$ of the wavelength $\lambda$, and which is used for lowpass and bandpass digital channelizing receiver ICs. Thus fully integrated, software controlled receivers on a chip or multi-chip module, are feasible using superconducting parts.

The superconducting (Nb based) circuits typically require cryopackaging, for example using a two-stage closed-cycle cryocooler to achieve the necessary operating temperatures, for example, at liquid helium temperatures. Preferably, in a two-stage cooler, the higher temperature stage is appropriate for cooling of HTS elements, which, for example, could be used to implement a filter architecture. The lower temperature stage preferably is large enough to accept a filter unit and has enough thermal lift to accommodate dissipation of the energy of large signals at higher temperatures. Alternately, a larger number of stages in a cooler ("coldhead"), e.g., 4 stages, with possibly higher efficiency may be employed. Because the bias current of each Josephson junction is preferably separately adjusted to provide the tuning, that the ~10 times worse critical current spread of YBCO vs. Nb junctions should not matter; therefore, the implementation of the filter (e.g., analog signal processor which is dependent on the first stage detector) may use either technology, or other known technologies as may be appropriate.

The system according to the present invention is suitable for use in intercept receivers designed to capture all the signals in the entire EM spectrum simultaneously and without the use of analog down-conversion. Such universal systems shine where the size/weight and awkwardness of providing many simultaneous channels and software defined, cross band data fusion in a conventional federated, channelized system is undesirable.

A preferred RF receiver front-end for rejection of multiple interferers over a wide bandwidth, with minimum effect on the rest of the passband, has characteristics which include:

1) Low insertion loss over the passband,
2) Very high attenuation in the stopband,
3) Sharp transition of the attenuation function at the band-edge,
4) Good phase linearity over the passband,
5) Sharp, deep notches, requiring very high quality factor (Q),
6) Ability to place the required number of notches (0<n<N) in the passband ($f_L$<f<$f_U$) at the desired locations ($f_i$) at any given time, and
7) Ability to tune each notch over the passband fast enough to track the interfering frequency component.

It is noted that, in some cases, the receiver may have a high quality model of the interfering signal. For example, in the case of co-site interference, a relatively pure representation of the interfering signal, or the information used to product that signal along with a model of the transmitter, may be readily available. In that case, instead of implementing a receiver which is tolerant to the interferor by simply rejecting it with a notch filter, the system may actively cancel the interferor, by subtracting the signal from the input in a phase-sensitive manner. In other cases, a model of the interfering signal may be created, which can estimate the required cancellation signal. In this case, the cancellation need only be sufficiently accurate to reduce the power of the interferor to within the linear range of the receiver; since the cancellation signal is known, artifacts resulting from errors in the model or estimate used to cancel the interferor may be dealt with in the digitized signal.

The preferred implementation of the spectrometer system preferably provides spectrum monitoring and tuning control to determine the instantaneous spectrum, identify multiple interferers, and determine the best allocation of notch filters so that the interference problem is minimized.

Achieving these characteristics becomes increasingly harder as the bandwidth increases, requiring carefully designed and tuned higher-order filter structures. However, the filter design becomes extremely difficult when the passband must include multiple sharp notch filters to excise undesired frequency components, especially when their spectral locations vary quickly in time.

The leading candidate for these demanding set of desired properties are superconductor passive filters, which have demonstrated the best performance for sharp-skirt bandpass and notch filters and have also demonstrated tunability. These filters have negligible insertion loss and very sharp transition at the band edge. With passive filters, even the superconductor ones, it is extremely difficult to maintain good amplitude and phase linearity over a wide band ($f_U-f_L$=400–225 MHz) when many very narrow ($\Delta f$=3 kHz) notch filters are required. Even if one accomplishes this difficult task, a large fraction of the receiver bandwidth is wasted and precludes the usage of certain wideband low-probability-of-intercept (LPE) and networking waveforms that intentionally overlap other signals and interferers in frequency. Therefore, the interference rejection scheme with tunable passive filters works best when the number of interferers rejected are small. However, there are a number of practical uses for this architecture.

Except at the lowest end of the RF spectrum, the preferred analog to digital converter (ADC) architecture of choice is the bandpass delta-sigma (BP $\Delta\Sigma$) oversampled ADC, which minimizes quantization noise at the resonant frequency of the loop filter. Superconductor BP $\Delta\Sigma$ ADCs are continuous time modulators, since sampling and quantization occur at the same step. Consequently, the loop filter is designed using analog lumped elements (inductors and capacitors) or sections of transmission lines. In practice, the loop filter may be designed to have a low frequency pass component, and thus have performance which extends to baseband. Therefore, while a bandpass design is typically preferred in order to provide an optimum low quantization noise, the known tradeoffs between bandwidth and noise may be exploited as desired.

To maximize signal-to-noise ratio in a BP $\Delta\Sigma$ ADC, two resonators are precisely matched (for second-order noise shaping), for example using a tuning element. An array of JJs in series with the loop inductor ($L_t$) provides such tuning capabilities. The inductance of this array may be varied by applying a bias current $0<I_b<I_c$, where $I_c$ is the junction critical current. A test of this filter demonstrated a tunability of about 10%.

This concept may be extended to excision filters, as demonstrated by modeling and simulations. Since the JJ array also has magnetic inductance, the tunable part of the total inductance is limited. For higher frequencies (8-10 GHz), models indicate that a 30% tuning is possible.

Figure 1:
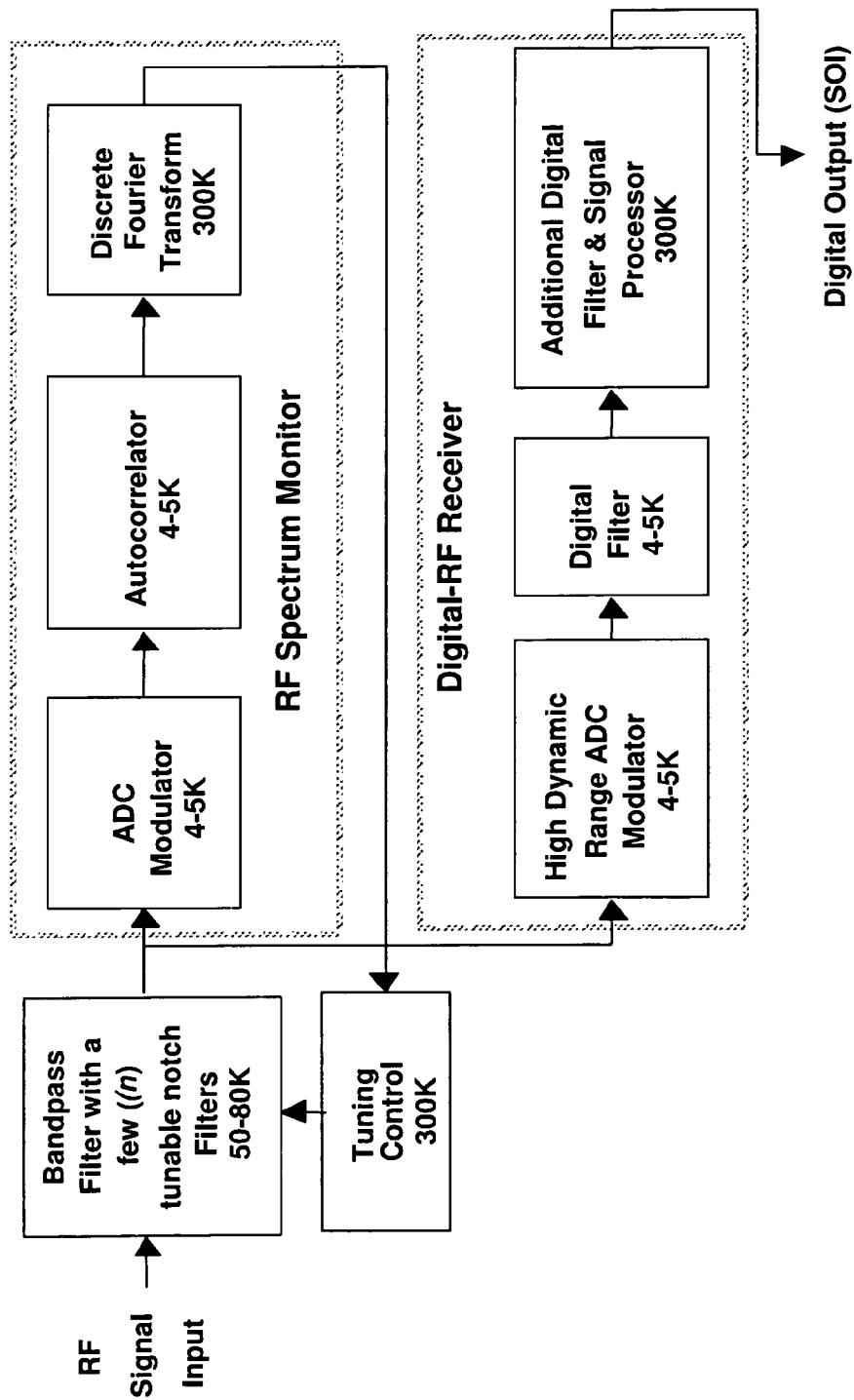
FIG. 1 shows a block diagram of a system in accordance with a preferred embodiment which employs low temperature superconducting processors, high temperature superconducting filters, and room temperature processors and controls.

FIG. 1 shows an implementation of the preferred embodiment. This heterogeneous-technology, hybrid-temperature approach combines ultrafast (20-40 Gbps) low-temperature superconductor (LTS) rapid single flux quantum (RSFQ) digital technology, high-temperature superconductor (HTS) analog bandpass and tunable notch filters, and room-temperature supporting electronics for slower, more complex digital processing.

The mixed-signal receiver front-end according to an embodiment of the present invention utilizes the complementary strengths of both analog and digital RF technology to avoid the weaknesses of either approach.

Figure 2B:
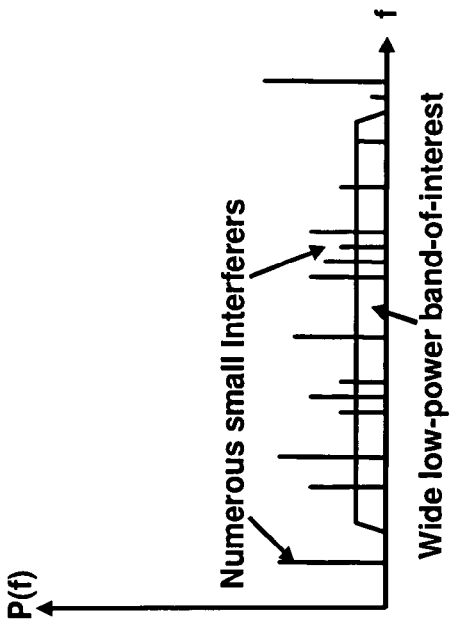
FIGS. 2A and 2B show graphs of exemplary signal environments where high amplitude signals may mask low amplitude ones.
Figure 2A:
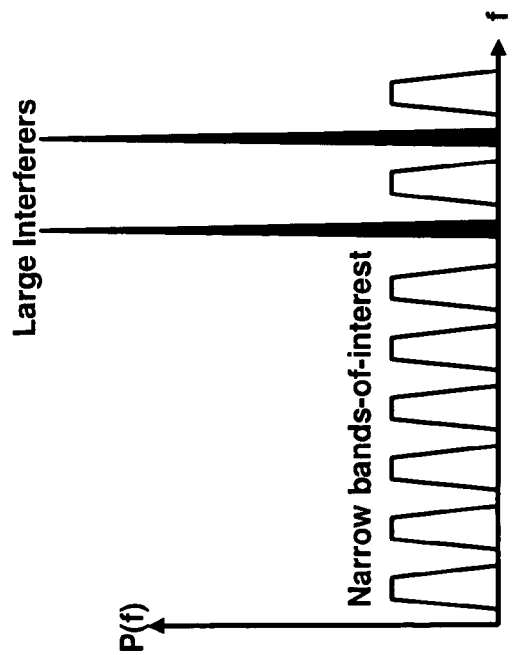

The required ADC dynamic range of a radio receiver is a function of the maximum amplitude signals present in the input and the resolution of the receiver required to reliably analyze and demodulate information from the weakest signal component of interest. Typically, this weakest signal component of interest is arbitrarily small, and therefore this can be replaced with an estimate of the noise floor, which would mask signals below that level. For example, the theoretical range between the maximum and minimum is 160 dB. In fact, in cases of co-site interference, dynamic ranges of this order may be encountered. In analyzing the signal, however, it is typically found that the high dynamic range is a result of a small number of high amplitude signals. The required ADC dynamic range may therefore can be greatly reduced if a few large interferers are rejected or cancelled before digitization. This implies the use of an analog RF front-end with tunable notch filters as shown in the power spectrum plot of FIG. 2A. The difference between the simple digital RF and the mixed-signal RF approaches is the use of tunable analog filters. The glue that binds the mixed signal RF front-end system is a broadband digital spectrometer that monitors the spectrum, identifies the worst interferers, and controls the tuning of notch filters to reject them. Through real-time measurement of the "interference temperature"—a term coined by the FCC to describe dynamic bandwidth assignments—this digital spectrometer also enables dynamic, real-time allocation of frequency bands for maximizing the overall communication spectral efficiency. The spectrometer also permits a radio control architecture in which, when the interference is greater in one part of the spectrum the user is re-allocated to another part.

Figure 4:
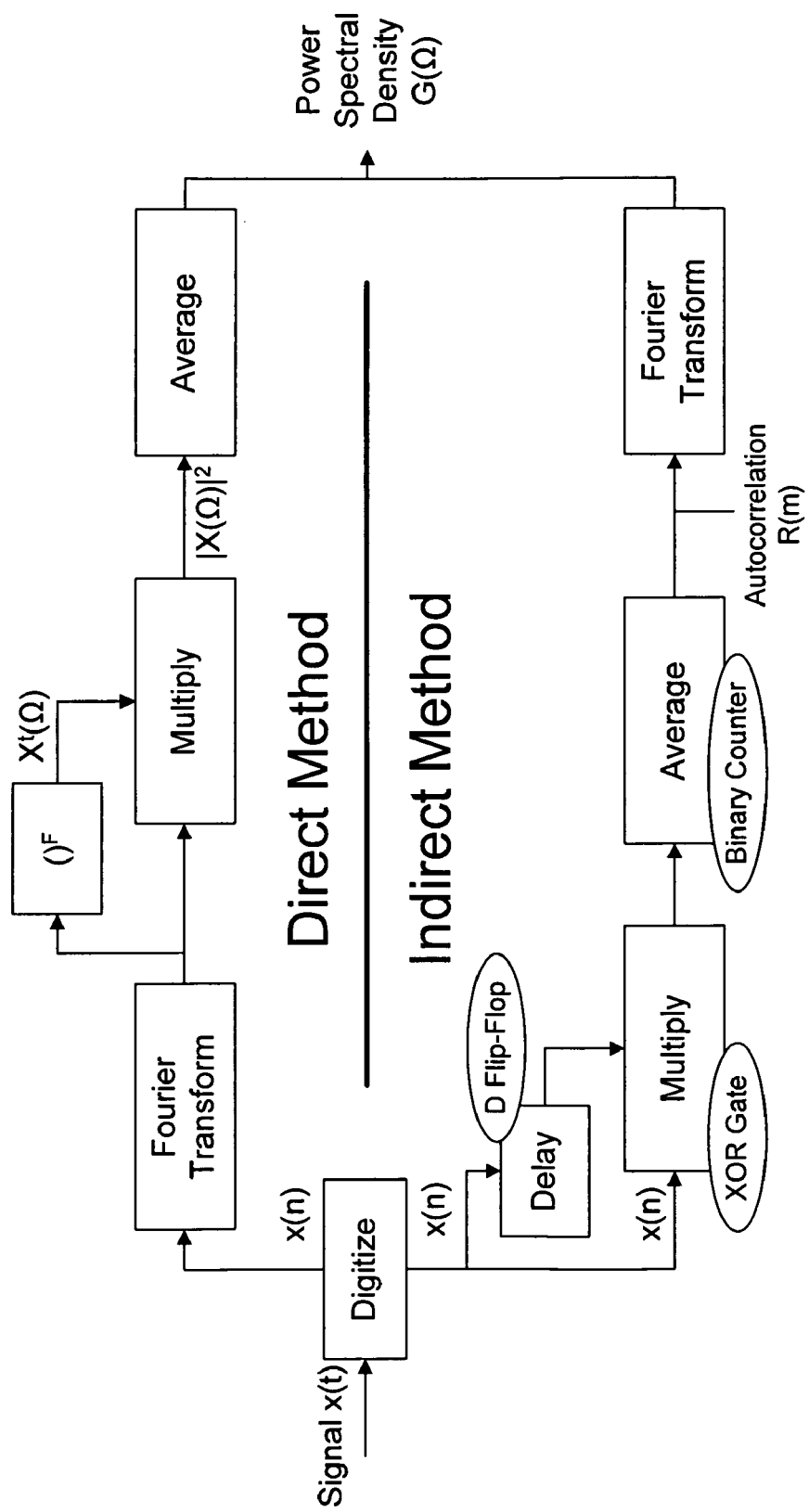
FIG. 4 demonstrates two alternate ways of obtaining the power spectral density function, the direct method which computes the Fourier transform of the input time domain signal, and the indirect method which finds the autocorrelation function first and then performs the Fourier transform.

The automated and dynamic front-end interference rejection system monitors the power spectral density across the band-of-interest. There are two classic ways of obtaining the power spectral density (PSD) function (FIG. 4). The first, direct method, is to compute the Fourier transform of the input time domain signal. The second, indirect method, is to find the autocorrelation function first and then perform the Fourier transform, recognizing that the autocorrelation and the power spectral density functions form Fourier transform pairs. In accordance with a preferred embodiment of the invention, the autocorrelation method is preferable for ultrafast digital-RF signals, produced by direct sampling of RF waveforms with a superconductor ADC, due to the simpler hardware realization in RSFQ digital logic of an autocorrelator, the output of which can then be processed at slower data rates than the data sampling rate to complete calculation of the Fourier transform. Therefore, the Fourier transform processor may be implemented using traditional computational architectures, e.g., silicon.

Almost all the signals, interference and noise that are of particular interest, e.g., communications, radar, etc., are classified as random, rather than deterministic, and are characterized by random variable statistical analysis. Deterministic signals are those with no uncertainty with respect to time; their value at any can be predicted exactly. Therefore, they cannot alone be used to communicate information. The term 'random' here implies that there is some degree of uncertainty before the signal actually occurs. For example, the mean and the standard deviation correspond to the DC component and the RMS value of the AC component of the signal. The communication signals and noise are also wide-sense-stationary; their mean and autocorrelation functions do not vary in time, at least not during some arbitrarily long observation interval. This implies that the mean or the DC signal component must be constant over this interval; in fact, in most cases it is zero. This also implies that the autocorrelation function is not a function of time, but is only a function of time difference. Another implication of wide sense stationality—perhaps, the most important one for signal processing—is that the time averages equal the ensemble averages. In other words, the statistical properties of such a random process (called ergodic) can be determined by time averaging over a single sample function. Thus for a signal x(t), $$\mu_x = \lim_{T \to \infty} \frac{1}{T} \int_{-T/2}^{T/2} x(t)\,dt, \text{ and } R_x(\tau) = \lim_{T \to \infty} \frac{1}{T} \int_{-T/2}^{T/2} x(t)x(t+\tau)\,dt$$

Table 2 shows relationships between random variable ensemble averages and electrical signal properties.

TABLE 2

| Mean | $\mu_x = E(x)$ | Average or DC Component of the signal |
|---|---|---|
| Mean Square | $E(x^2)$ | Total average power |
| Variance | $\sigma_x^2 = E[(x - \mu_x)^2] = E(x^2) - \mu_x^2$ | AC Power |
| Autocorrelation | $R_x(t_1, t_2) = E[x((t_1)x(t_2))]$ | Measure of the degree to which two time samples are related |

Let us first examine the problem in the continuous time domain with a signal x(t) and its Fourier transform, $$X(\omega) = \int_{-\infty}^{\infty} x(t)e^{-j\omega t}\,dt.$$

Correlation is a matching process; autocorrelation refers to the matching of a signal with a delayed version of itself. The autocorrelation function forms a Fourier Transform pair with the power spectral density function:

$$S(\omega) = \int_{-\infty}^{\infty} R(\tau)e^{-j\omega t}\,dt = \lim_{T \to \infty} \frac{1}{T}[X(\omega)X^*(\omega)] = \lim_{T \to \infty} \frac{1}{T}|X(\omega)|^2$$

In our case, the input signal is sampled at regular time intervals ($T_s$), and form a discrete time sequence, x(n). The discrete time Fourier transform of this signal is $$X(\Omega) = \sum_{n=-\infty}^{\infty} x(n)e^{-j\Omega n}, \text{ where } \Omega = \omega T_s$$

Figure 5:
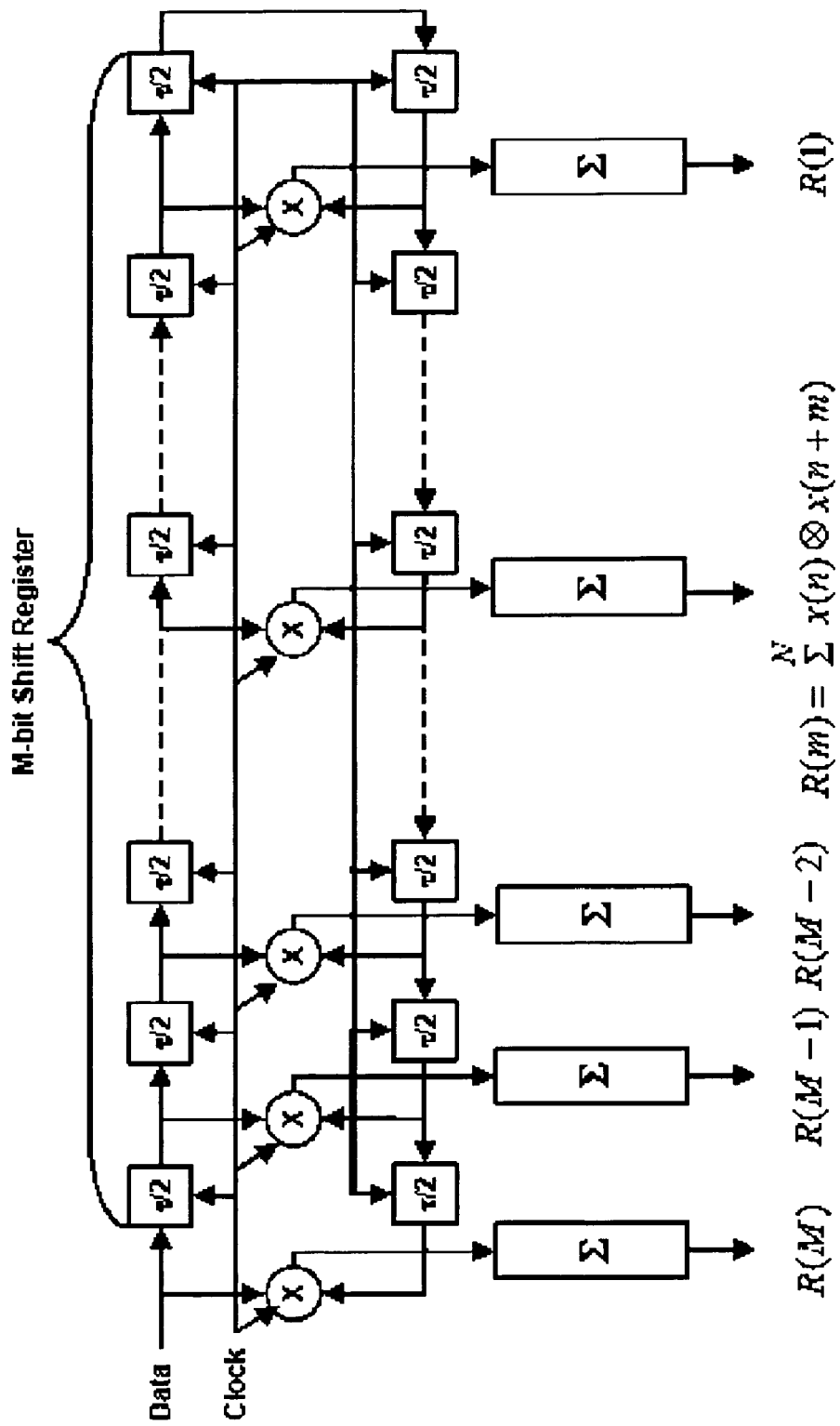
FIG. 5 shows a digital autocorrelator architecture.

To calculate the power spectrum of a signal, we need to perform three mathematical operations: Fourier transform, multiplication, and statistical averaging (FIG. 5). In the direct method, we do the Fourier transform first and then perform the multiplication (or amplitude squaring) and statistical averaging. In the indirect (autocorrelation method), the process is reversed: we multiply (with time delayed signal) and average (ergodicity allows time averaging) in the time domain before taking the Fourier transform. There are two reasons for a preference of the indirect autocorrelation method:

1) In superconductor RSFQ technology, we can perform very fast logic (20-40 Gbps) but are generally limited to relatively simple ICs (thousands of logic gates, rather than millions). In this case, the digitized signal, x(n), is a single-bit or low order bit oversampled sequence, a 20-40 Gbps stream of '1's and '0's. This dramatically simplifies the hardware for the fast time domain processing: the multiplication and time averaging steps are performed with single logic (XOR or AND) gates and a binary ripple counter respectively. We can compute the autocorrelation function with RSFQ hardware and leave the task of FFT of the slower, multi-bit autocorrelator output to a room temperature processor to yield the power spectrum. On the other hand, the direct method would require us to implement discrete Fourier transform hardware (20 Gbps FFT) at the highest sample rate, which is more difficult.

2) The primary drawback of the direct method is the need for statistical averaging (the expectation operation) that is often overlooked. A convenient approximation to the PSD function [S(Ω)] is the "sample spectrum" [Ŝ(Ω)], where the expectation operator (E) is simply disregarded.

$$S(\Omega) = \lim_{M \to \infty} E\left[\frac{1}{2M+1}\left|\sum_{n=-M}^{M} x(n)e^{-j\Omega t}\right|^2\right] \xrightarrow{approximation}$$

$$\hat{S} \lim_{M \to \infty} \frac{1}{2M+1}\left|\sum_{n=-M}^{M} x(n)e^{-j\Omega t}\right|^2$$

However, the sample spectrum is a biased and inconsistent estimator of the power spectral density function. Various complex mathematical processes, such as windowing and segmentation, can improve the situation somewhat, but are more suited for off-line processing in a computer, rather than real-time in hardware. Consequently, often the hardware implementations are fundamentally inferior to their autocorrelation spectrometer counterparts.

The frequency span of the desired spectrum is the inverse of the autocorrelation time lag. If there are M points or discrete delays (lags) in an autocorrelator, each separated in time by the autocorrelation time lag, $\tau_{lag}$, the corresponding spectrum will also have M points, ranging from $f=-1/(2\tau_{lag})$ to $f=1/(2\tau_{lag})$. The frequency resolution of such a spectrum is $\Delta f=1/(M\tau_{lag})$.

The digital autocorrelator consists of digital delay elements ($\tau_{lag}/2=1/f_{clk}$), digital multipliers and digital counters. A regular structure as depicted in FIG. 5 may be employed. While a single chip implementation is preferred, a multiple chip design is acceptable, especially where the required number of lags (M) to produce the desired frequency resolution, $\Delta f=1/(M\tau_{lag})$ is large. Thus, a multi-chip architecture may be provided so that a set of ICs can be connected together with fast interchip data links to produce a long autocorrelation vector (R).

The preferred analog tunable filters employ the high-temperature superconductor (HTS) technology. These filters can produce extremely low insertion loss (<<1 dB), and large quality factors (Q~50,000) and are far superior to conventional metallic filters. One concern for these filters is possible nonlinear distortion at high power (>10 dBm). Therefore, it is also possible to implement these filters using low-temperature superconductor (Nb) technology to provide improved linearity.

Figures 6A, 6B:
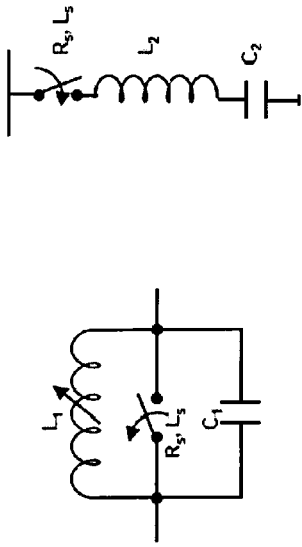
FIGS. 6A and 6B shows two simplified schematics of parallel and series filter types, respectively.

An important aspect of the filter design in accordance with a preferred embodiment of the invention is the ability to place a notch at a desired frequency location, and to vary its position quickly. To do this, switching and tuning circuits are required. A preferred system will provide multipole filters with many parallel and series resonators (FIGS. 6A and 6B), all of which must be properly adjusted. However, to illustrate the switching process, consider a simple notch filter section consisting of a parallel LC circuit, which blocks the resonant frequency $$f_1 = \frac{1}{2\pi\sqrt{L_1 C_1}}$$

and a series LC circuit that shunts the resonant frequency $$f_1 = \frac{1}{2\pi\sqrt{L_2 C_2}}.$$

A low inductance switch can short the parallel LC circuit when the notch is not needed. Since the switch inductance ($L_s$) is much smaller than $L_1$, the effective resonance frequency will be much higher than $f_0$ and out of band. The off-state resistance ($R_s$) must be very high to obtain a high quality factor. On the other hand, the series LC circuit can be inserted into the circuit by closing a series switch, which remains open when the notch is not required. Here the on-state resistance must be very small. A superconductor switch that has zero on-state resistance is, therefore, ideal. However, with conduction-type superconductor switches the off-state resistance is usually not high enough. However, by stacking switches or otherwise modifying the architecture, these may be acceptable. Alternately, semiconductor, or MEMS switches may be used for this application.

Tuning of HTS filters is traditionally done mechanically. Although slow, this method has been successfully demonstrated. The same technique could apply to LTS filters. Filters can also be tuned by varying kinetic inductance or by varying the inductance of a Josephson junction array. However, a preferred way of tuning a JJ junction inductance is by varying a bias voltage.

Figure 7:
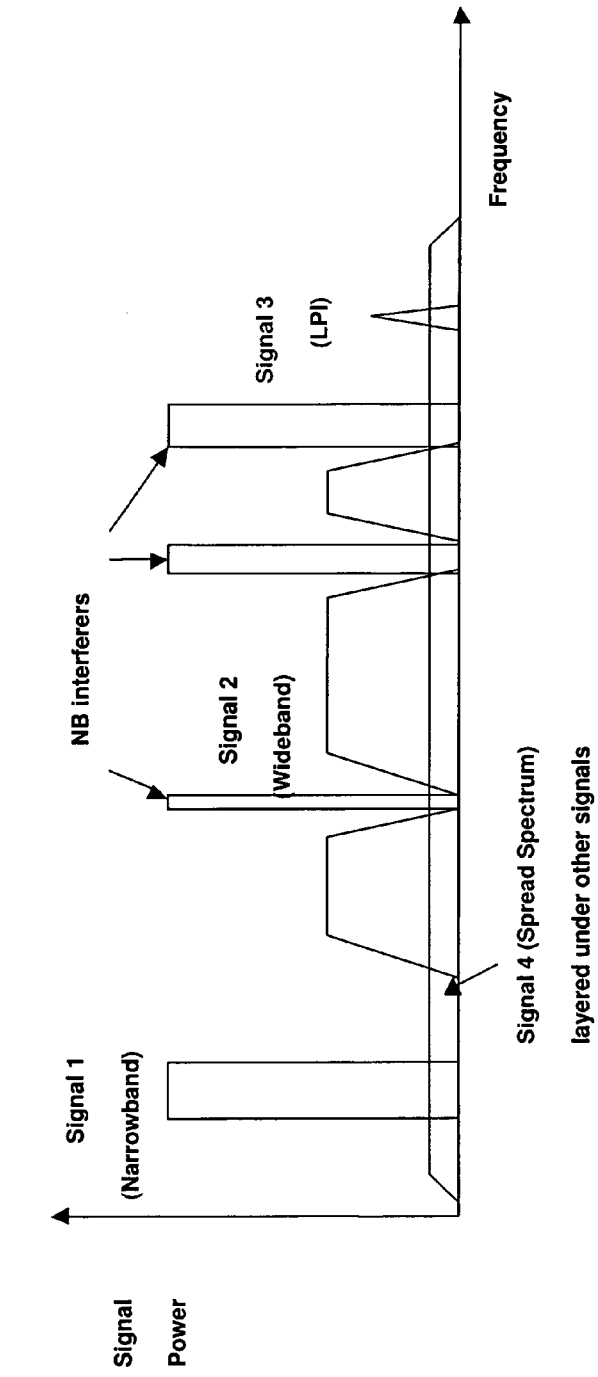
FIG. 7 represents operation of a dynamic bandwidth allocation system.
Figure 8:
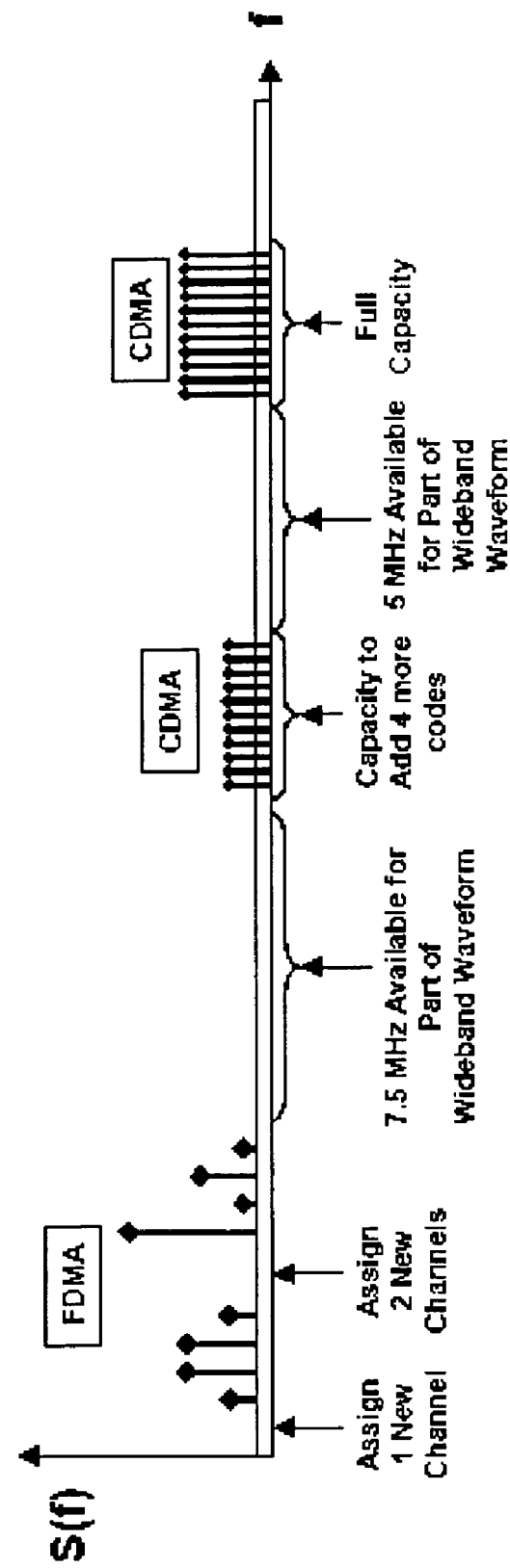
FIG. 8 represents a spectrum monitor to permits assessment of the available capacity in each part of the spectrum.

The present invention provides a basis for a whole new generation of RF communications hardware, with particular application to software-defined radio (SDR). By integrating spectrum monitoring and waveform processing functions in a receiver, one can perform dynamic band and bandwidth allocation to maximize the spectral efficiency of communication. Dynamic bandwidth allocation requires the ability to assign signals-of-interest to whatever spectrum is available and understand it after reception (FIG. 7). For wide band signals, this might imply dividing the signal into multiple constituents and placing them into discrete and disjoint frequency slots. The spectrum monitor also permits assessment of the available capacity in each part of the spectrum (FIG. 8). Coupled with an intelligent controller, the users can now be assigned different modulation and multiple access scheme, as well as different frequency bands to achieve the best link margins and maximum data rates at any given time. In fact, when the interference scenario changes, the user is automatically reassigned to a better band. The present invention, however, is not limited to communications but extends to SIGINT, EW and other RF receivers.

The present invention provides a programmable autocorrelation spectrometer, which simultaneously permits wideband staring and narrowband zooming functions.

If f(t) is a signal, the spectral density $\Phi(\omega)$ of the signal is the square of the magnitude of the continuous Fourier transform of the signal:

$$\Phi(\omega) = \left| \frac{1}{\sqrt{2\pi}} \int_{-\infty}^{\infty} f(t) e^{i\omega t} dt \right|^2 = F(\omega) F^*(\omega)$$

where $\omega$ is the angular frequency ($2\pi$ times the cyclic frequency) and $F(\omega)$ is the continuous Fourier transform of f(t). If the signal is discrete with components $f_n$, we may approximate f(t) by:

$$f(t) \approx \sum_n f_n \delta(t - n)$$

where $\delta(x)$ is the Dirac delta function and the sum over n may be over a finite or infinite number of elements. If the number is infinite we have:

$$\Phi(\omega) = \left| \frac{1}{\sqrt{2\pi}} \sum_{-\infty}^{\infty} f_n e^{-i\omega n} \right|^2 = \frac{F(\omega) F^*(\omega)}{2\pi}$$

where $F(\omega)$ is the discrete-time Fourier transform of $f_n$. If the number is finite (=N) we may define $\omega = 2\pi m/N$ and:

$$\Phi_m = \left| \frac{1}{\sqrt{2\pi}} \sum_{n=0}^{N-1} f_n e^{-2\pi i m n/N} \right|^2 = \frac{F_m F_m^*}{2\pi}$$

where $F_m$ is the discrete Fourier transform of $f_n$. The multiplicative factor of $\frac{1}{2\pi}$ is not absolute, but rather depends on the particular normalizing constants used in the definition of the various Fourier transforms. The spectral density of a signal exists if and only if the signal is stationary. If the signal is not stationary then the same methods used to calculate the spectral density can still be used, but the result cannot be called the spectral density.

One of the results of Fourier analysis is Parseval's theorem which states that the area under the spectral density curve is equal to the area under the square of the magnitude of the signal:

$$\int_{-\infty}^{\infty} |f(t)|^2 \, dt = \int_{-\infty}^{\infty} \Phi(\omega) \, d\omega.$$

The above theorem holds true in the discrete cases as well.

The spectral density $\Phi(\omega)$ of f(t) and the autocorrelation $R(\tau)$ of f(t) form a Fourier transform pair. The spectral density may be calculated using the Fourier transform, Welch's method and the maximum entropy method.

As discussed above, and as a preferred implementation, another approach to obtaining the power spectral density function $\Phi(\omega)$ of a time-domain signal x(t) is to first takes the product of the signal x(t) with a time-delayed version x(t−τ), and average this over a sufficiently long time T to obtain the autocorrelation function $R(\tau)$.

If the signal is first digitized, then both the autocorrelation $R(\tau)$ and the Fourier transform $F(\omega)$ can be obtained in the discrete digital domain. The relative resolutions in the time and frequency domains are similar. For example, a time series of 16 time correlations with delays from 1 ns to 16 ns corresponds to a frequency series of 16 points from −500 MHz to +500 MHz with 62.5 MHz resolution.

A broadband RF signal may be digitized directly, using an ultrafast single-bit oversampled analog-to-digital converter (ADC). For a bandwidth on the GHz scale, this requires a bitstream at a rate of order 20 GHz or above. The key problem with the direct approach is that the hardware for a fast Fourier transform on this bitstream is difficult to implement at the required speeds. On the other hand, the autocorrelation function requires only simple flip-flops, XOR gates, and binary counters, which can be easily carried out using ultrafast RSFQ superconducting electronics. The time correlations are generated in parallel with m multiple channels, or "lags", each with a fixed delay mτ. The Fourier transform of the resulting averaged autocorrelation function can be done at a much lower speed using a conventional computer at room temperature.

Figure 9:
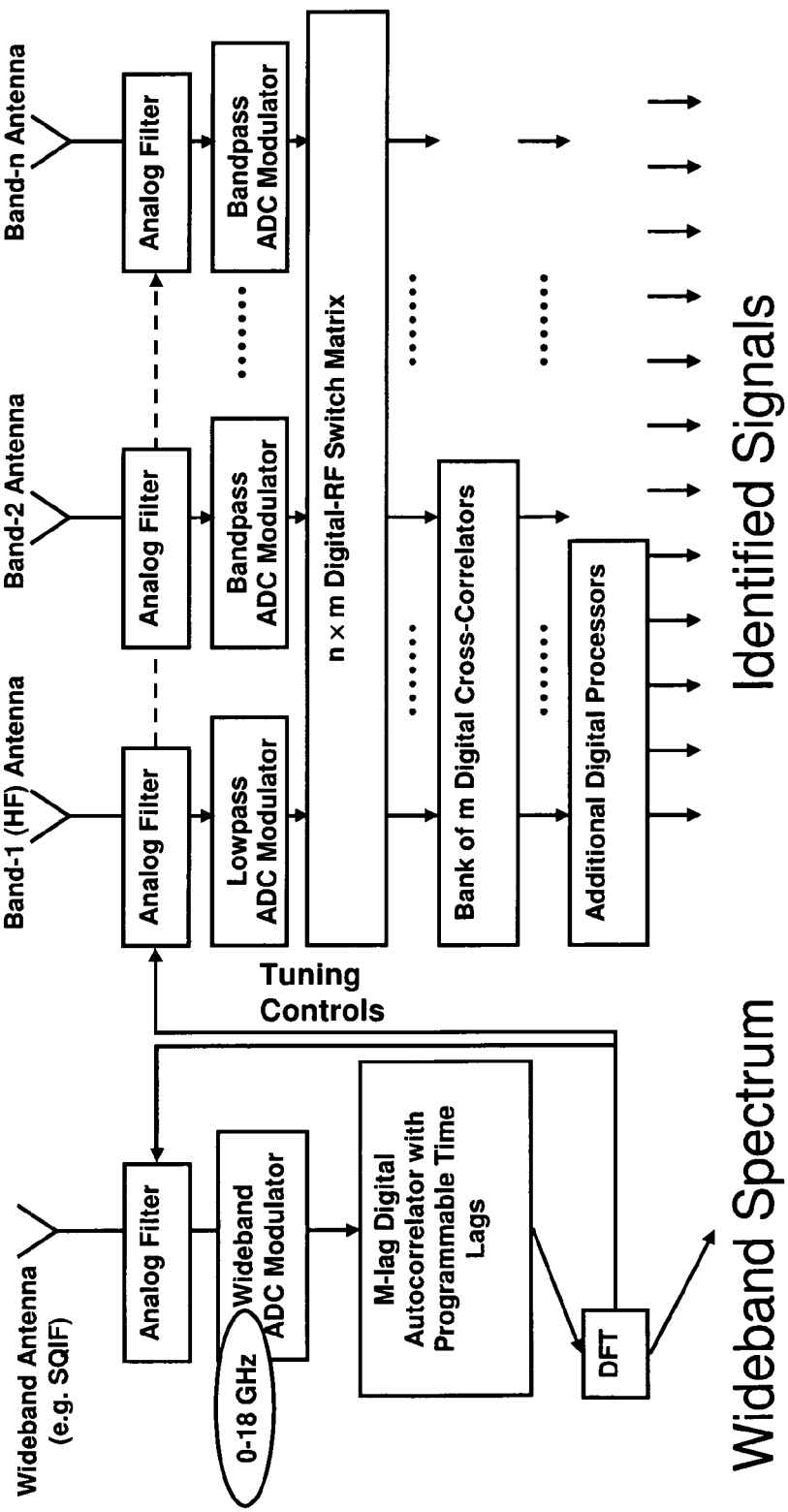
FIG. 9 shows a block diagram of a wideband digital cross-correlation receiver.
Figure 10:
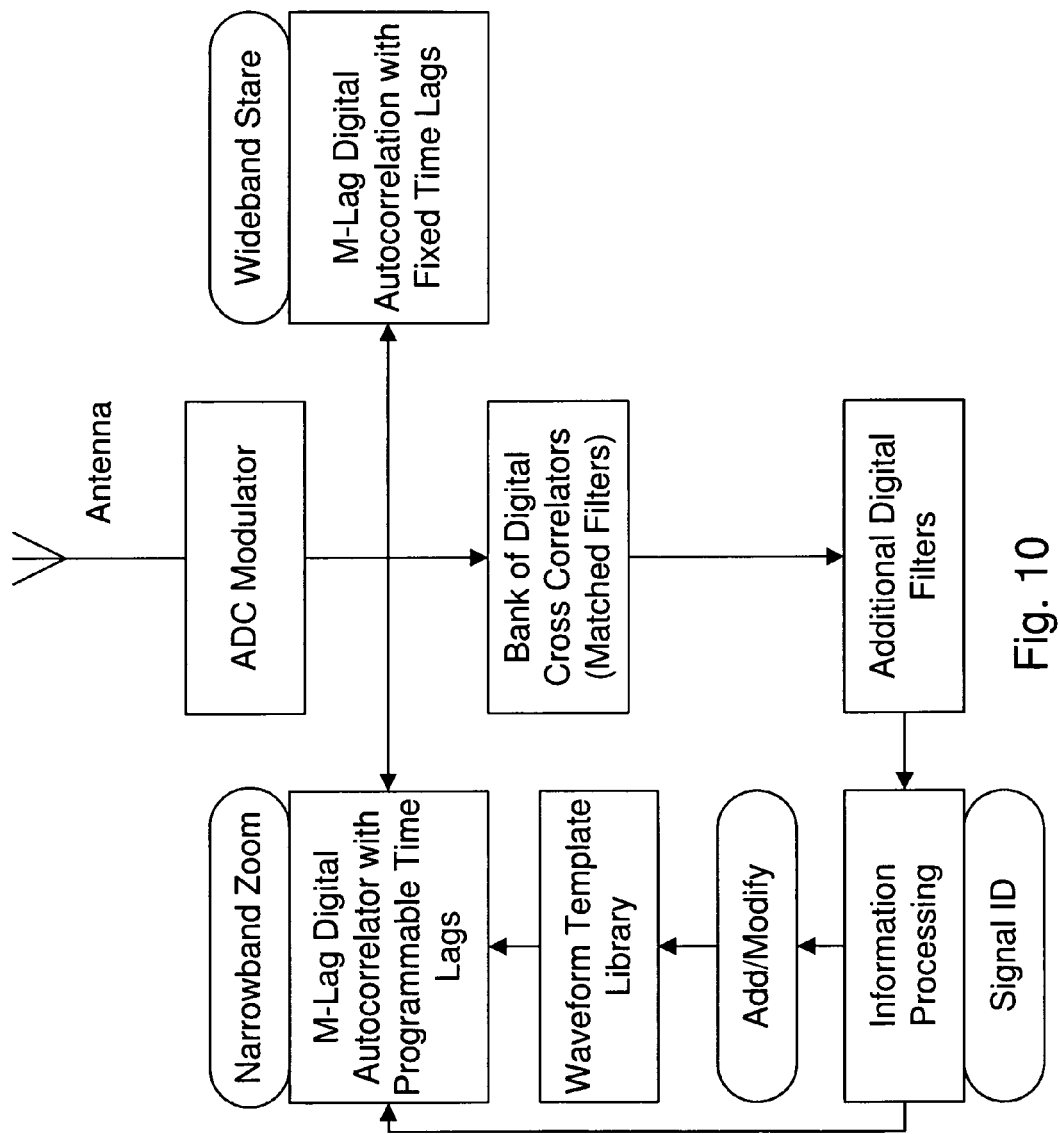
FIG. 10 shows a digital "zoom" spectrometer implementation.

A further capability in accordance with an embodiment of the invention provides the additional ability to "zoom in" under software control, or focus on a particular region of the power spectrum. This can be achieved by combining the autocorrelator(s) with a digital mixer, with a programmable digital local oscillator (LO), as illustrated in FIGS. 9 and 10. Both in-phase and quadrature (I and Q) components are needed in order to separate signals on the two sides of the LO frequency. This single-bit mixer uses the same circuitry as the multipliers. Since this function is not a broadband function, the use of a mixer and frequency translation are acceptable, since this mixer is not within the normal analog signal processing chain.

FIG. 9 shows a block diagram of a wideband spectrum monitoring system which employs reallocatable resources through a digital RF switch matrix. Therefore, a variety of resources may be provided for a receiver system, which are not dedicated to a particular channel or band. In accordance with an embodiment of the present technology, a wideband antenna receives an input signal representing all signals of interest, or more properly, at least all potentially interfering signals of interest. A tunable filter is optionally provided for this wideband receiver section, which, for example, has a bandwidth of 0-18 GHz. A wideband analog to digital modulator digitizes the wideband (optionally filtered) input, and the digitized output is then processed by an autocorrelator, which preferably has programmable time lags, a feature which supports "zoom" functionality to increase the frequency resolution of the wideband analyzer. As is known, the digitizer may be a single bit delta sigma topology, or it may be processed to provide increased resolution at lower output data rate. Preferably, both the analog to digital modulator and the autocorrelator are implemented in a low temperature superconducting technology, which provides an ability to operate at very high speeds, without downconversion, frequency translation, or other techniques which potentially introduce non-linear distortion into the signal, or produce other types of artifacts. The output of the autocorrelator is a parallel digital representation which can be transferred from the device at substantially lower data rates than the basic sampling rate of the analog to digital modulator, and thus a discrete Fourier transform (DFT) may be completed using standard technologies (e.g., silicon-based digital signal processor(s)) operating at room temperature. The DFT is used to determine the frequency characteristics of strong interferors, which is then used to determine tuning parameters for an analog filter or set of filters. Optionally, one such filter is provided in the wideband spectrometer input, which increases the effective dynamic range of the wideband spectrometer. Another advantage of providing this filter, is that it facilitates closed loop feedback of the filter tuning parameters.

The analog filter itself may be a low temperature superconductor (LTS) filter, such as is described above with respect to FIGS. 3A, 3B and 3C, or an agile electronically tuned high temperature superconductor (HTS) filter, or a hybrid of both technologies. Preferably, the analog filter can be tuned within about 1 nanosecond, thus permitting rapid tracking of a dynamic signal environment.

The wideband spectrometer output is also used to tune filters for a set of band-specific channels, which may themselves be narrowband. Thus, the wideband spectrometer need not have as high a sensitivity or other characteristics required for identifying and extracting information from signals of interest, and rather has sufficient immunity to interference and bandwidth to identify the interferors. Of course, the wideband spectrometer and its outputs are not limited to that function, and in particular may be used for characterizing wideband spread spectrum signals, identifying available spectrum for dynamic allocation, and even for demodulating certain information-bearing signals.

In accordance with one embodiment, instead of using a common antenna and filter for both determining characteristics of interferors and capturing a signal of interest, a set of separate antennas and input sections are provided for different bands, represented in FIG. 9 as Band-1, Band-2, ..., Band-n. Each band and antenna may have a separate filter bank, which, for example, may have capacity for filtering one or more separate interferors within a band. Advantageously, each antenna may have optimized gain, polarization, spatial discrimination and direction, and other characteristics appropriate for the signals to be received (and excluded), In this case, the filter for each band may differ from the filter for the wideband spectrometer, since the antenna (and possible other input circuits) itself will filter signal components which are out-of-band. On the other hand, a generic wideband filter may be implemented for each band. In general, each band will require its own filter bank, because the signals from different antennas generally cannot be summed without introducing artifacts, attenuation, distortion, or the like.

According to the present technology, the filter banks need not be limited to a predetermined number of notch filters, and indeed the poles and zeros of the filter bank may be individually programmable to achieve a set of desired filter characteristics. For example, a filter bank comprising 1000 poles and 1000 zeros, each independently programmable/controllable, may be provided for each filter bank. The programming values may be determined by ambient temperature electronics, though for full agility, LTS control circuits may be preferred.

The output of each filter bank is digitized by a separate analog to digital (ADC) modulator. In this case, these ADC modulator need only have bandwidth and other characteristics appropriate for the signals within that band. For example, the lowest frequency band may extend to baseband, and thus the ADC modulator may be a lowpass design. Other bands will typically have selective bandpass designs. It is preferred that each of these be implemented as an HTS circuit.

According to the embodiment of FIG. 9, the digitized signals are then fed to a digital-RF switch matrix, which routes the ADC modulator outputs to a variety of processing circuits, which are not specific for any one band, and which are reallocable to different purposes. The number of processing circuits can be the same as, less than, or greater than the number of bands. The digital-RF switch matrix, for example, operates at the highest sampling rate, for example >36 GHz. Likewise, each of the circuits which follow the matrix can also handle inputs at that rate. On the other hand, special purpose circuits may also be provided after the switch matrix, which are limited to particular applications.

Figure 13:
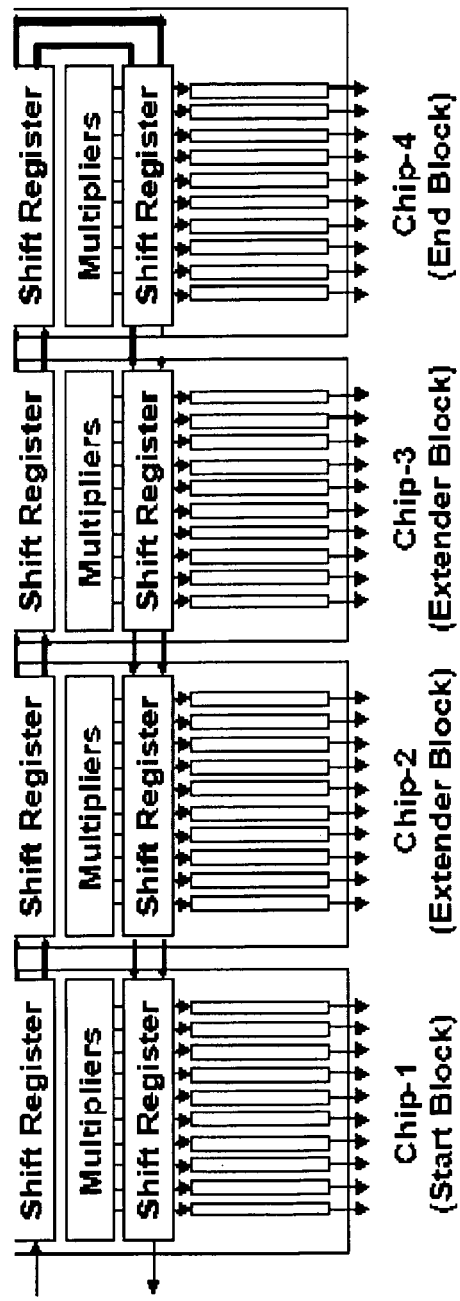
FIG. 13 shows an interchip data transmission circuit which partitions a long autocorrelator structure among multiple chips.

For example, a set of digital cross correlators may be provided, which can be allocated as desired, with zero, one or more per band. For example, high spectral resolution may require additional digital cross correlator elements for a particular band, while other bands may require no such processing. Thus, in addition to providing a switch matrix to allocate individual resources to a particular band, a switch matrix may also interconnect these elements, such as is shown in FIG. 13, to provide extended processing capability on an as-needed basis. The outputs of the digital cross correlators may be connected to dedicated circuitry, as represented in FIG. 9, or a second level switch matrix may be provided to allocate other types of resources.

One advantageous function of the system, is signal identification, which may be derived from both the wideband system elements and the band-specific elements. Likewise, the band-specific elements may provide useful information for the wideband spectrometer, for example additional filter control information.

Another advantage of this architecture is that it can provide precise matched filtering using the digital-RF cross-correlator bank.

The frequency resolution of the spectrometer is $\Delta f = B/M$, where $B=1/\tau$ is the total bandwidth being measured. As illustrated in FIGS. 9 and 10, a zoom feature provides a digital local-oscillator (LO) and digital mixer, in order to shift the center of the frequency range. In addition, it is necessary to increase the time delay between sequential lags in the autocorrelator. Decreasing the local shift register clock frequency is the most convenient way to increase the time lags (r) but requires the digitized data stream to be downsampled. A programmable clock divider may be used to divide a high frequency clock (e.g., up to 20 GHz) by, e.g., a 10-bit integer. Another way to achieve this is by using a programmable digital delay line. Such a delay line can be used to obtain frequency resolution down to ~100 MHz or less. Finer frequency resolution can be obtained from room-temperature processing of filtered digital data. See, Vernik et al., "Integrated Millimeter-Submillimeter Superconducting Digital Spectrometer", *IEEE Trans. Appl. Supercond.*, vol. 15, p. 419, June 2005; A. V. Rylyakov et al., "All-digital 1-bit RSFQ autocorrelator for radioastronomy applications: design and experimental results", *IEEE Trans. Appl. Supercon.*, vol. 8, p. 14, 1998; D. Gupta, W. Li, S. B. Kaplan, and I. V. Vernik, "High-Speed Interchip Data Transmission Technology for Superconducting Multi-Chip Modules," *IEEE Trans. Appl. Supercond.*, vol. 11, pp. 731-734, March 2001; each of which is expressly incorporated herein by reference.

Cross correlation of two signals is also very useful. For two signals f(t) and g(t), one can define the cross correlation, for discrete functions $f_i$ and $g_i$, as $$(f \star g)_i \equiv \sum_j f_j^* g_{i+j}$$

where the sum is over the appropriate values of the integer j and an asterisk indicates the complex conjugate. For continuous functions f(x) and $g_i$ the cross correlation is defined as $$(f \star g)(x) = \int f^*(t) g(x+t) dt$$

where the integral is over the appropriate values of t. The cross-correlation is similar in nature to the convolution of two functions, by the following relation:

$$f(t) \star g(t) = f^*(-t) * g(t)$$

so that $$(f \star g) = f^* * g$$

if either f or g is an even function. Also:

$$(f \star g) \star (f \star g) = (f \star f) \star (g \star g)$$

If f and g are similar functions that are in phase with one another, then the correlation function $X(t, \tau)$ will be positive. If they are out of phase, the correlation will be negative. If they are uncorrelated, then X will tend toward 0 if the averaging time T is long enough. The phase delay time $\tau$ can be adjusted to change the relation of correlated signals between fully in-phase to fully out-of-phase.

For a typical correlation receiver for SIGINT applications, one wants to compare an unknown signal f(t) with one or more standard reference signals $g_i(t)$. If one can identify an appropriate g, that shows correlation effects, then one has gone a long way towards identifying the nature and source of the unknown signal. FIGS. 9 and 10 shows the block diagram of such a digital cross-correlation receiver, where an ADC is used to convert the input RF signal into the digital domain. Assume that one has first used a spectrometer to identify the spectral location of the signal of interest. Then, one may select an appropriate waveform template, and synthesize it digitally within the receiver. Furthermore, the time delay $\tau$ can be digitally adjusted to show maximum correlation.

An important component of the digital-RF correlator is a fast multiplier, which for bipolar input signals corresponds to an exclusive-OR (XOR) gate. A version of the well-known RSFQ clocked XOR gate works at rates up to 20 GHz, however, the disparate rates of the high frequency (at $f_{clk}$=20 GHz and higher) digitized RF stream and the low frequency ($f_{RF}$=0-400 MHz) template may be a hindrance to scaling to higher frequencies. To circumvent data-dependent timing problems, a new circuit, called a 'streaming XOR', is provided. This circuit (FIG. 11) performs the XOR operation using an asynchronous two-input multiplexer and a D flip-flop with complementary outputs (DFFC). The DFFC, clocked at high-speed, produces synchronous single-bit data (A) and its complement ($B=\overline{A}$) and presents it as two inputs to the multiplexer. The low-speed digital signal (S) is applied to the select input of the multiplexer to produce the desired output (Y=SA+SB=SA+S$\overline{A}$=S$\otimes$A). This implementation has been used to perform digital in-phase and quadrature mixing in a digital-RF channelizer.

Figure 11:
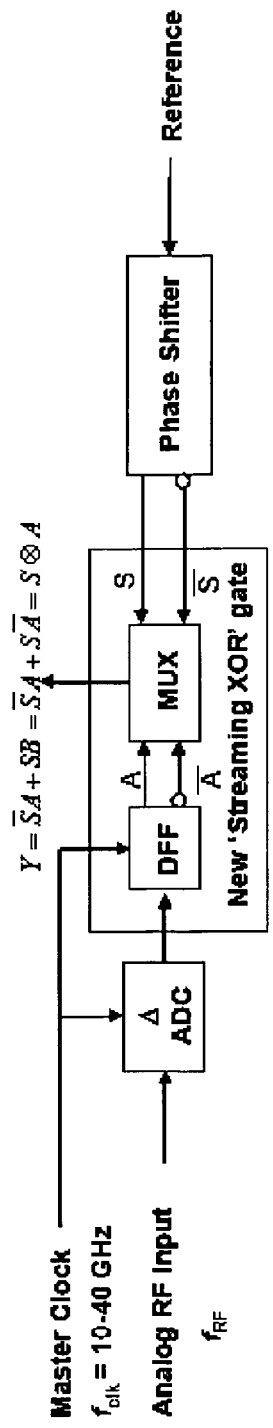
FIG. 11 shows a layout of a streaming XOR digital mixer.

A layout of a prototype for this streaming XOR has a layout and block diagram indicated in FIG. 11.

Finally, because an autocorrelation spectrometer shares much of the circuit architecture with a cross-correlation detector, it is natural to combine them both into the same digital receiver system. This is suggested by the block diagram of FIG. 1, where a common ADC digitizes the RF signal and feeds a single-bit oversampled pulse train to both correlator components.

Figure 12:
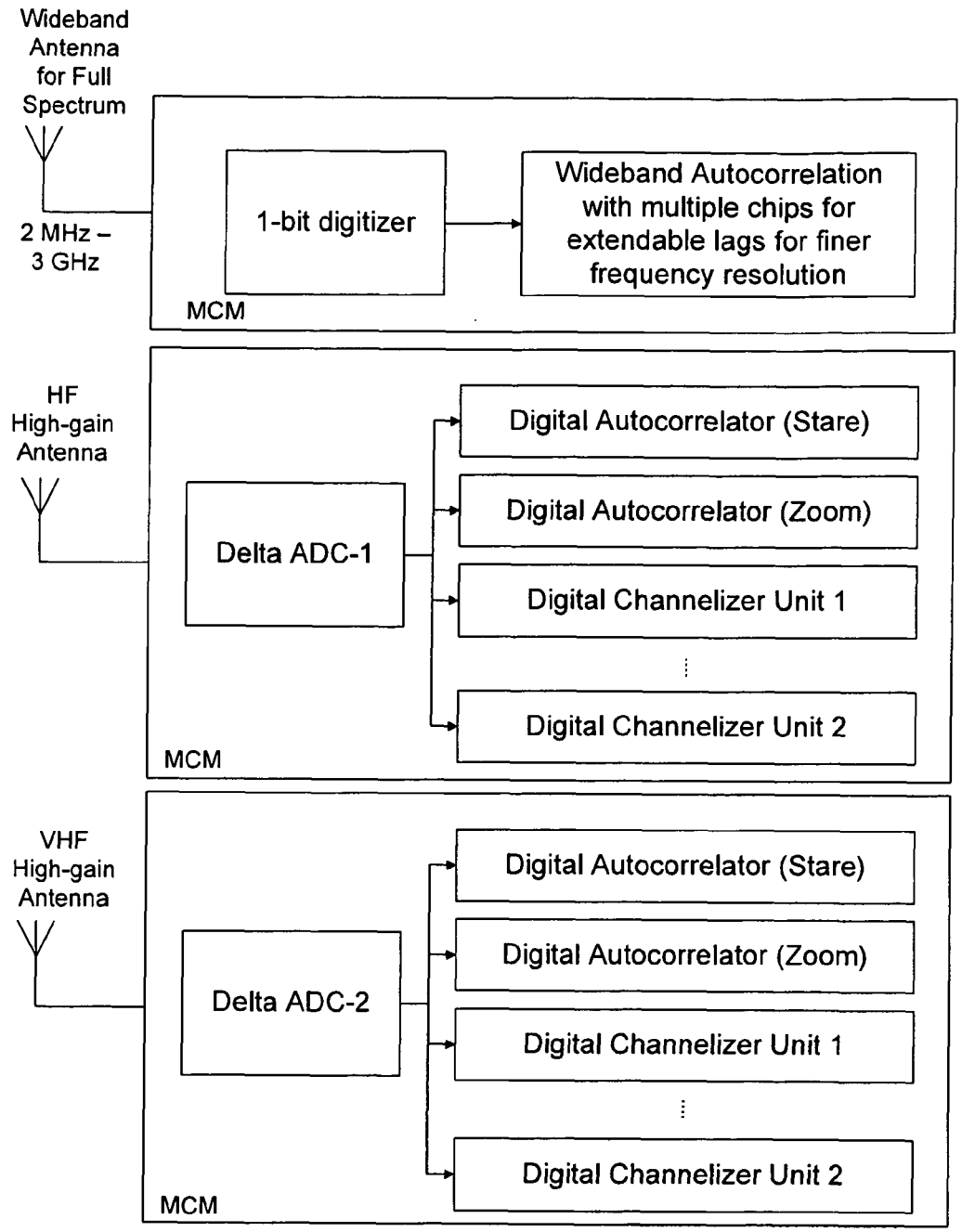
FIG. 12 shows a block diagram of a wideband RF receiver system.

An important consideration in the design of some wideband RF receiver systems is the need to combine signals from multiple antennas, covering different sub-bands of the overall spectrum. Given the very broad bands involved (for example, 0.1-3 GHz), it is not practical to combine these as analog RF signals. But they can be coupled to an array of ADCs, and the digitized signals can either be added or directed to separate spectrometers and correlation detectors (FIG. 12).

Using extremely fast clocks (40 GHz), a digitizer and single-bit digital autocorrelator in accordance with an embodiment of the present invention will be able to monitor the entire 0-10 GHz spectrum. In order to provide a reasonable frequency resolution over such an extremely wide band, an autocorrelator requires a large number of time lags. These may not all be accommodated on a single chip. However, an ultrafast interchip data transmission circuit permits convenient partitioning of a long autocorrelator structure among multiple chips (FIG. 13).

Figure 14:
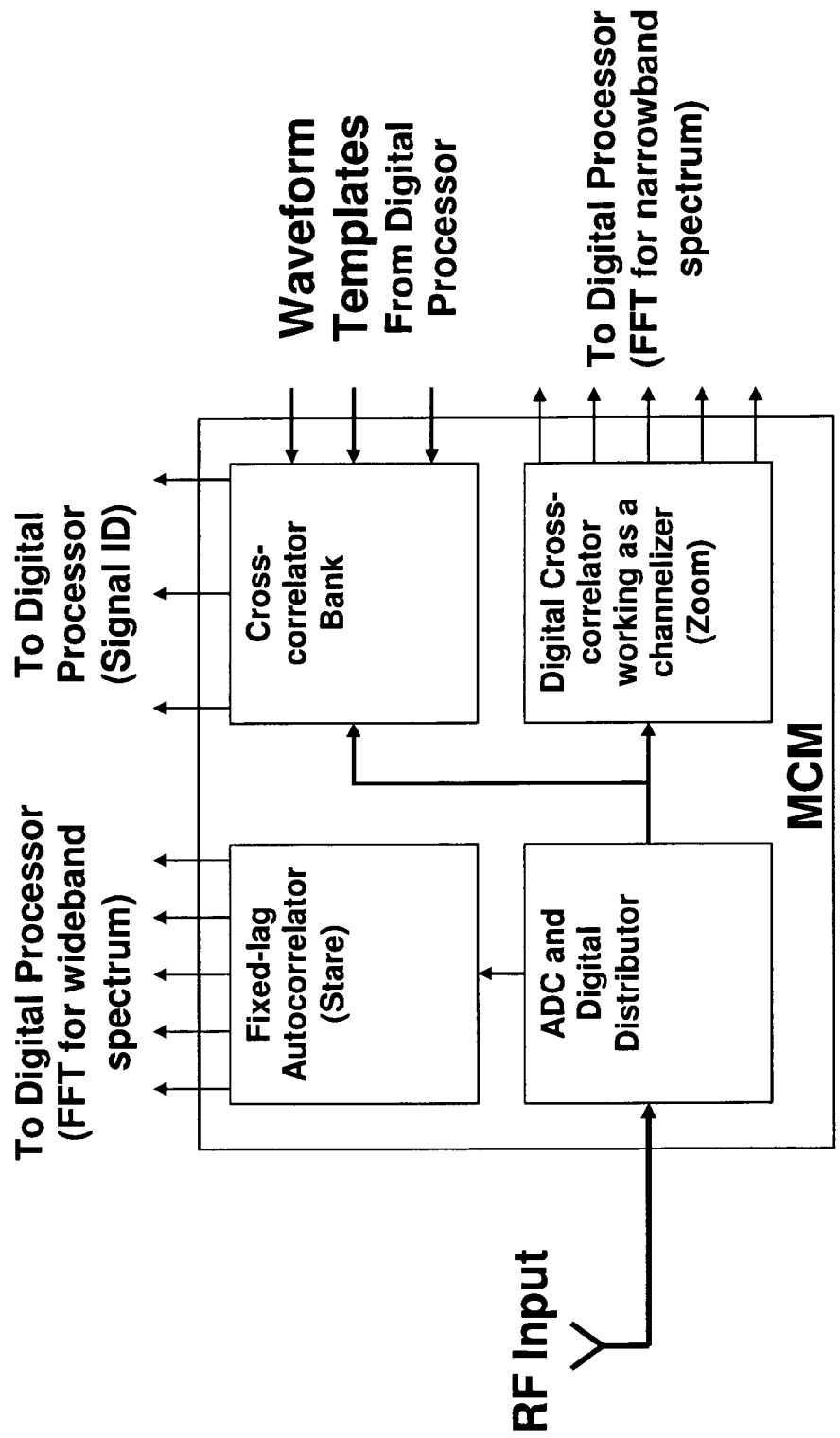
FIG. 14 shows an embodiment of a multi-chip module which includes a front-end digitizer, two autocorrelators, and a cross-correlator bank.

As described above, there are many possible configurations for a superconducting spectrometer/receiver, depending on the platform, frequency band, etc. However, a preferred embodiment incorporates all essential components on a single multi-chip module (FIG. 14). This includes the front-end digitizer, two autocorrelators (both coarse and fine), and a cross-correlator bank.

For example, an embodiment of the invention provides a first stage input which comprises a 40 Gbps delta-sigma converter implemented in Nb low temperature superconductor technology from Hypres, Inc., having a full scale input set (either with a predetermined gain, or with a controlled gain amplifier) to a level which does not saturate with a maximum signal input. The output of the converter is then fed to an autocorrelator, also implemented in low temperature superconducting technology. The output of the autocorrelator exits from the cryochamber, and is processed by a digital signal processor implemented using conventional technologies, to compute a discrete Fourier transform of the input signal. This Fourier transform reveals amplitude peaks within the frequency spectrum. The output of the digital signal processor is then analyzed using standard logic, to determine which signals are to be suppressed. The frequency locations of these signals are then used to compute parameters of a set of electrically controllable notch filters, which may be implemented using various technologies. A first preferred technology comprises a high temperature superconductor (<80K) notch filter, as is known. A second preferred technology comprises a low temperature superconductor (<10K) notch filter, implemented using niobium-Aluminum oxide-niobium Josephson junctions, wherein the inductance characteristic of a set of junctions are individually tuned with their respective bias voltages. For example, a set of 16, 12 pole, 12 zero notch filters may be provided. A representation of the input signal is filtered using the notch filter bank, and fed to a second 40 Gbps delta-sigma converter implemented in Nb low temperature superconductor technology, having a full scale input set to a level which is, for example, 30 dB below the maximum signal input of the first stage. The output of the second ADC is fed to a low temperature superconducting technology circuit, which may also include superconducting digital signal processing circuitry, and finally the processed digital signal is presented for processing by room temperature processing circuitry to implement a wideband digital radio receiver.

The present embodiments are to be considered in all respects as illustrative and not restrictive, and all changes which come within the meaning and range of equivalency of the claims are therefore intended to be embraced therein. The invention may be embodied in other specific forms without departing from the spirit or essential characteristics thereof. The disclosure shall be interpreted to encompass all of the various combinations and permutations of the elements, steps, and claims disclosed herein, to the extent consistent, and shall not be limited to specific combinations as provided in the detailed embodiments.

What is claimed is:

1. A signal processing system, comprising:
   (a) an input port, configured to receive a time-continuous signal having at least two signal components;
   (b) a first signal sampler, configured to receive the signal from the input port, and to produce a discrete-time signal in dependence thereon;
   (c) a signal processor, configured to receive the discrete time signal, and to transform the signal to generate therefrom a set of spectral signal characteristics;
   (d) an analog signal processor, configured to receive at least one control signal dependent on the set of spectral signal characteristics, and the time-continuous signal, and to produce at least one modified analog output based thereon; and
   (e) a signal quantizer, configured to receive the modified signal, and to quantize it to produce a quantized output, the quantized output being substantially without intermodulation distortion products of the at least two signal components.

2. The signal processing system according to claim 1, wherein the first signal sampler comprises a superconducting analog to digital modulator.

3. The signal processing system according to claim 1, wherein the signal processor comprises a digital correlator.

4. The signal processing system according to claim 1, wherein the signal processor comprises a digital correlator and a processor configured to compute a signal transform based on a correlation of the discrete time signal determined by the digital correlator.

5. The signal processing system according to claim 4, wherein the signal transform comprises a frequency domain transform, and wherein the analog signal processor is configured to receive the control signal in dependence on at least one frequency transform domain characteristic of the time-continuous signal.

6. The signal processing system according to claim 5, wherein the analog signal processor comprises a frequency selective filter, and wherein characteristics of the frequency selective filter are determined based on frequency components of the time-continuous signal.

7. The signal processing system according to claim 1, wherein the first signal sampler, at least a portion of the signal processor, and at least a portion of the analog signal processor comprise superconducting circuits.

8. The system according to claim 1, wherein the controllable transfer function of the analog signal processor is controlled to have at least one narrow stop band selected to attenuate at least one large amplitude interferor in the at least one modified analog output.

9. A spectrometer, comprising:
an input port configured to receive a wideband radio frequency signal having spectral characteristics and being subject to a presence of an interfering signal;
an analog filter having a controllable transfer function without substantial nonlinearity, configured to receive the wideband radio frequency signal from the input port and attenuate at least a portion of the wideband radio frequency signal;
a wideband signal digitizer, having an oversampled digitizing rate of at least twice a highest frequency of an upper band limit of the wideband radio frequency signal, receiving a representation of the wideband radio frequency signal substantially modified by the controllable transfer function without substantial nonlinearity, the digitizer being subject to nonlinear distortion by an unattenuated interfering signal;
a digital processor, configured to receive an output of the wideband digitizer, and to process the output to compute spectral characteristics thereof; and
a filter control, configured to control the transfer function of the analog filter in dependence on at least the computed spectral characteristics to selectively attenuate an interfering signal to reduce a nonlinear distortion in the digitizer.

10. The spectrometer according to claim 9, wherein the upper band limit of the wideband radio frequency signal is at least 500 MHz.

11. The spectrometer according to claim 9, wherein the digital processor receives data from the wideband signal digitizer at a rate of at least 1 GHz.

12. The spectrometer according to claim 11, wherein the digital processor comprises a digital correlator.

13. The spectrometer according to claim 9, wherein the analog filter is configured to have at least one notch in the passband, having a selectable notch center frequency, to selectively attenuate a narrowband signal, and wherein the filter control is configured to adjust the notch center frequency, based on an identification of a large amplitude interferor by the digital processor.

14. The spectrometer according to claim 9, wherein the digital processor is configured to formulate a model of an interferor; and the filter control is configured to control the transfer function of the analog filter in dependence on the model.

15. A spectrometer, comprising:
an input port configured to receive a wideband radio frequency signal having at least one radio frequency component;
a controllable analog filter having a controllable transfer function configured to attenuate the at least one radio frequency component within the wideband radio frequency signal;
a wideband signal digitizer subject to nonlinear distortion by an unattenuated at least one radio frequency component, configured to receive and digitize a representation of the wideband radio frequency signal substantially without broadening of a spectrum of the attenuated at least one radio frequency component, and having an oversampled digitizing rate of at least twice a maximum frequency of the at least one radio frequency component; and
a digital processor, configured to receive an output of the wideband digitizer, and to process the output to compute a transfer function of the controllable analog filter to attenuate the at least one radio frequency component.

16. The spectrometer according to claim 15, wherein the digital processor is configured to compute spectral characteristics of the output of the wideband digitizer.

17. The spectrometer according to claim 15, wherein the wideband radio frequency signal comprises a component having a frequency of at least 500 MHz.

18. The spectrometer according to claim 15, wherein the digital processor receives data from the wideband digitizer at a rate of at least 1 GHz.

19. The spectrometer according to claim 18, wherein the digital processor comprises a digital correlator.

20. The spectrometer according to claim 15, wherein the controllable analog filter, the wideband signal digitizer, and the digital processor each comprise at least one superconducting circuit component.

21. The spectrometer according to claim 20, wherein the controllable analog filter comprises a high temperature superconductor circuit.

22. The spectrometer according to claim 15, wherein the digital processor is configured to identify at least one large amplitude narrow band frequency component in the wideband radio frequency signal and to compute the transfer function of the analog filter to selectively block a large amplitude narrow band frequency component in the wideband radio frequency signal.

23. A real time spectrometric method, comprising:
receiving a transmitted wideband electromagnetic radiation signal, having at least one large amplitude component;
adaptively filtering the at least one large amplitude component to reduce a dynamic range of a wideband residual of the wideband electromagnetic radiation signal;
quantizing an amplitude of the wideband residual, at a sampling rate in excess of twice a frequency of the at least one large amplitude component of the transmitted wideband electromagnetic radiation signal, with a quantizer unsaturated by the filtered at least one large amplitude component and saturated by the unfiltered at least one large amplitude component and;
analyzing the quantized amplitudes of the wideband residual comprising multiplying at the sampling rate a time series representing the at least one quantized amplitude, to determine at least one spectral characteristic of the digitized residual; and
extracting adaptation parameters from the digitized residual for said adaptively filtering.

24. The method according to claim 23, wherein the at least one large amplitude component has a frequency of at least 500 MHz, and the quantizing occurs at a rate of at least 1 GHz.

25. The method according to claim 23, wherein the analyzing comprises computing a correlation.

26. The method according to claim 23, wherein the wideband residual is substantially free of non-linear distortion with respect to the transmitted wideband electromagnetic radiation signal.

27. The method according to claim 23, further comprising the step of cooling a component to achieve superconductivity.

28. The method according to claim 23, wherein the quantizing step comprises employing a superconducting quantum interference device in a delta-sigma digitizer topology.

29. A spectrometer, comprising:
an input port configured to receive a wideband radio frequency signal having spectral characteristics;
an analog filter having a controllable transfer function without substantial nonlinearity, configured to receive the wideband radio frequency signal from the input port and attenuate at least a portion of the wideband radio frequency signal;

a wideband signal digitizer, receiving a representation of the wideband radio frequency signal substantially modified by the controllable transfer function without substantial nonlinearity;

a digital processor comprising a correlator, configured to receive an output of the wideband digitizer, and to process the output to compute spectral characteristics thereof; and a filter control, configured to control the transfer function of the analog filter in dependence on at least the computed spectral characteristics.

30. A spectrometer, comprising:

an input port configured to receive a wideband radio frequency signal having spectral characteristics and being subject to a presence of an interferor;

an analog filter having a controllable transfer function without substantial nonlinearity, configured to receive the wideband radio frequency signal from the input port and attenuate at least a portion of the wideband radio frequency signal to produce a modified wideband radio signal;

a wideband signal digitizer, receiving the modified wideband radio frequency signal and producing a digital signal representing the modified wideband radio frequency signal;

a digital processor, configured to receive the digital signal, and to formulate a model of the interferor dependent on at least spectral characteristics thereof; and a filter control, configured to control the transfer function of the analog filter in dependence on at least the formulated model.

31. A real time spectrometric method, comprising:

receiving a transmitted wideband electromagnetic radiation signal, having at least one large amplitude component;

adaptively filtering the at least one large amplitude component to reduce a dynamic range of a resulting filtered wideband electromagnetic radiation signal;

quantizing an amplitude of the filtered wideband residual;

analyzing the quantized amplitudes of the filtered wideband signal to compute a correlation and determine at least one spectral characteristic of the digitized residual; and extracting adaptation parameters from the digitized residual for said adaptively filtering.

* * * * *